United States Patent
Etminan

(10) Patent No.: US 12,551,519 B2
(45) Date of Patent: Feb. 17, 2026

(54) EXTRACTION SYSTEM AND METHOD FOR ORGANIC METABOLITES

(71) Applicant: VCENNA Technology & Labs Inc., Vancouver (CA)

(72) Inventor: Seyed Reza Etminan, Vancouver (CA)

(*) Notice: Subject to any disclaimer, the term of this patent is extended or adjusted under 35 U.S.C. 154(b) by 437 days.

(21) Appl. No.: 18/138,101

(22) Filed: Apr. 23, 2023

(65) Prior Publication Data

US 2024/0123005 A1  Apr. 18, 2024

Related U.S. Application Data

(60) Provisional application No. 63/334,512, filed on Apr. 25, 2022.

(51) Int. Cl.
*B01D 11/02* (2006.01)
*A61K 36/06* (2006.01)
*B01D 36/00* (2006.01)

(52) U.S. Cl.
CPC .......... *A61K 36/06* (2013.01); *B01D 11/0207* (2013.01); *B01D 11/0257* (2013.01); *B01D 11/0265* (2013.01); *B01D 11/0288* (2013.01); *B01D 36/00* (2013.01); *A61K 2236/31* (2013.01)

(58) Field of Classification Search
CPC ............ B01D 11/0257; B01D 11/0265; B01D 11/0207
See application file for complete search history.

(56) References Cited

U.S. PATENT DOCUMENTS

| | | |
|---|---|---|
| 10,851,038 B1 | 12/2020 | Novitski et al. |
| 11,014,098 B2 | 5/2021 | Stephens et al. |
| 2021/0179967 A1* | 6/2021 | Craig ................. B01D 11/0257 |
| 2021/0393717 A1 | 12/2021 | Lightburn et al. |

FOREIGN PATENT DOCUMENTS

| | | | |
|---|---|---|---|
| CA | 3097246 | 11/2021 | |
| CA | 3161623 | 12/2021 | |
| CA | 3103707 | 6/2022 | |
| WO | WO-2022074467 A1 * | 4/2022 | ......... B01D 11/0211 |

* cited by examiner

*Primary Examiner* — Kevin Joyner

(57) ABSTRACT

A system for extracting substances from a source material includes a chamber assembly, one or more ultrasonic transducers, and one or more convective mixing mechanisms. The chamber assembly defines a chamber. The chamber is configured to hold source material and a solvent such that at least a portion of the source material is immersed in the solvent. The one or more ultrasonic transducers are configured to produce ultrasonic waves that impinge on at least a portion of the portion of the source material in the solvent. The one or more mixers are configured to mix at least a portion of the source material.

15 Claims, 20 Drawing Sheets

EXTRACTION SYSTEM AND METHOD FOR ORGANIC METABOLITES

This application claims priority of U.S. provisional patent application 63/334,512, filed on Apr. 25, 2022, which is herein incorporated by reference.

TECHNICAL FIELD

This invention relates to methods and systems for extracting organic substances from organic matter. Some implementations of the invention relate to ultrasound-assisted extraction of natural metabolites in plants, fungi, and animal bodies.

BACKGROUND

Organic substances, such as metabolites, have use in a wide range of applications including food, cosmetics, and pharmaceuticals. These compounds can be extracted from naturally occurring plant, fungal, and animal sources. Existing extraction techniques include the use of solvents, which are time-consuming and can be harmful to the environment, and ultrasound-assisted extraction, which has traditionally been limited by the need for high power consumption to overcome low extraction efficiency. A piezoelectric transducer is a common source of ultrasound power.

High power ultrasound is typically applied using one of two types of devices: ultrasonic bath or probe-type ultrasound. An ultrasonic bath typically includes a stainless steel tank with one or several ultrasonic transducers. With an ultrasonic probe, intensity is delivered through a smaller surface: only the tip of the probe. For higher volumes, an inline continuous flow mode can be introduced, where the fluid mixture is pumped at atmospheric or high pressure into a confined volume holding the probe to conduct monosonication. An ultrasonic probe can quickly induce an increase of temperature in a reactor, which may degrade the compounds of interest.

Some existing systems focus on extracting active compounds positioned on a plant's surface. For example, in the cannabis and hemp industry, systems may extract active compounds from the trichomes on the plant's surface. Such systems often rely on "residence time" or "soaking time" to allow for further dissolution of hydrophobic trichomes through molecular diffusion.

Organic matter target metabolites are complex mixtures generally present in tight structural matrices deep within the organic material rather than at the surface, at low concentrations, and are susceptible to temperature degradation. As a result, they can be difficult to efficiently extract from naturally occurring sources.

SUMMARY

The present disclosure relates to methods and systems for extracting substances from a source material. The source material may be an organic matter.

In some embodiments, ultrasound-assisted extraction (UAE) is used in combination with other mechanisms to extract metabolites from natural products. The ultrasound-assisted extraction may utilize ultrasonic transducers that produce ultrasonic waves that impinge on at least a portion of the source material. The ultrasonic waves may break down organic matrices that carry metabolites and small molecules that are desired to be extracted from the organic matrices. The organic matrices may be broken down due to the high energy of the ultrasonic waves and the formation of nano cavity bubbles that burst and contribute to the release of the target metabolites and small molecules.

One general aspect of the disclosure features a system for extracting substances from a source material including a chamber assembly, ultrasonic transducers, and one or more convective mixing mechanisms. The chamber assembly defines a chamber, a revolving drum, and a lid. The chamber is configured to hold source organic material and a solvent such that the source material is fully immersed in the solvent. The ultrasonic transducers are configured to produce cavitation fields that are imposed instantaneously on the entire source material in the solvent. The one or more convective mixing mechanisms are configured to homogenize and disperse at least a portion of the source material in solvent. The chamber assembly may comprise a lid that may be configured to cover the chamber. The ultrasonic transducers may be configured on the lid whereby they point towards the source material. The source material may be configured within a bag within the revolving drum in the chamber. The bag may be a mesh bag. The bag may have an opening through which a stirring element of a mixer is accepted. A pass-through plastic cover may be configured on the opening. The pass-through plastic cover may prevent source material from exiting the bag when the stirring element of the mixer is not inserted into the bag.

In some embodiments, the system includes one or more revolving devices in the chamber configured to centrifuge at least a portion of the source material in the chamber. The one or more revolving devices may spin the source material within the chamber in order to mix the source material and to help the biomass get dried out of the solvent. The source material may be spun and/or mixed by a mixing rod at a low RPM, which may be 500 rpm to 1500 rpm, inclusive of said values. The source material may also be spun by a revolving drum. The revolving drum may spin at 10 rpm to 75 rpm, inclusive of said values, during a mixing phase and a draining phase. The revolving drum may spin at 500 rpm to 2200 rpm, inclusive of said values, during a dry out phase. The source material may be spun bidirectionally to create active convective mixing.

The draining phase and dry out phase may be carried out after sonication and mixing of the source material. These phases may remove the solvent from the source material and dry the source material.

The one or more convective mixing mechanisms may include but are not limited to a mixer with a shaft and stirring element (wherein the stirring element may be a propeller), jets that produce bubbles which are directed towards the source material, and the one or more revolving devices. The one or more revolving devices may be a revolving drum. The one or more convective mixing mechanisms may facilitate cavitation within the source material, which allows for uniform penetration of ultrasonic waves across the entire source material. Uniform penetration of the entire source material by the ultrasonic waves may allow for extracting a high amount of substances from the source material. This is advantageous over other systems and methods that exist in the art wherein ultrasonic waves are directed towards a small portion of the source material, do not facilitate cavitation within the source material, and therefore do not allow for uniform penetration of the entire source material by the ultrasonic waves.

The ultrasonic waves may be generated while the source material is mixed. However, the source material may be mixed for a longer time than it is exposed to the ultrasonic waves. Sonication of the source material (impingement of the source material by ultrasonic waves) may be 15% to 50%, inclusive of said values, of the total mixing time. The mixing rod may be used for 90% to 150%, inclusive of said values, of the total time of sonication. The revolving drum may be used for 30% to 600%, inclusive of said values, of the total time of sonication. The gas jets may be used for 5% to 50%, inclusive of said values, of the total time of sonication. Sonication of the source material may be 5% to 25%, inclusive of said values, of the total time of the process of extracting the substance(s) from the source material. The stirring element may only be used to mix the source material during sonication. When sonication is not occurring, the mixer may be retracted away from the chamber whereby the stirring element does not contact the source material. The mixer may be retracted using a rail system, which may be configured on a lid of a chamber assembly.

In another general aspect of the disclosure, a method of extracting substances from a source material includes placing the source material in a (perforated or meshed) bag; placing the bag containing the source material into a chamber and then flooding the closed chamber with solvent such that the source material in the bag is immersed in a solvent; producing ultrasonic waves (or high energy cavitation field) that impinge on the source material in the solvent; and mixing at least a portion of the source material in the solvent. Since producing ultrasonic waves is used to generate a high energy cavitation field which aids in extracting one or more substances from the source material, the terms "ultrasonic waves" and "high energy cavitation field" may be used interchangeably herein. It shall be understood that when the term "high energy cavitation field" is used herein, the high energy cavitation field comprises a plurality of ultrasonic waves generated by ultrasonic transducers.

In another general aspect of the disclosure, a method of extracting a substance from organic material includes receiving, by a computer system, data about one or more characteristics of an organic material, a substance contained in the organic material, or a solvent; performing, by a computer system, one or more computations, wherein at least one of the computations relates to at least one of the one or more characteristics of the organic material or at least one of the characteristics in the substance contained the organic material or at least one of the characteristics of the solvent; and extracting, from organic material, based at least in part on at least one of the one or more computations, at least a portion of the substance contained in the organic material.

Another general aspect of the disclosure features a computer system configured to perform one or more computations and an extraction system coupled to the computer system. At least one of the computations relates to one or more characteristics of an organic material, one or more characteristics of a substance contained the organic material, or one or more characteristics of a solvent. The extraction system is configured to extract, from the organic material placed a solvent in the extraction system, based at least in part one at least one of the one or more computations, at least a portion of the substance contained in the organic material.

Another general aspect of the disclosure features a system including a centrifuge system configured to receive organic material, an ultrasonication system configured to generate ultrasonic waves, a mixing propeller, one or more bubble jet mixers, and a control system. The centrifuge system can include a motor, a drive shaft, bearings, and a perforated rotating drum. The ultrasonication system can generate ultrasonic waves and imply them to the organic material. The mixing propeller can create axial and radial flow during sonication. The bubble jet mixers can improve the axial flow of the fluid to achieve uniform exposure of the product to ultrasonic waves. The control system can read data from one or more sensors and optimize the centrifugation and ultrasonication procedure, providing safety control and automatic operation with user defined programs. The system can perform isothermal extraction via temperature-controlled operation by a heating/cooling liquid jacket and a vacuum chamber.

Particular embodiments of the subject matter described in this specification can be implemented so as to realize one or more of the following advantages.

Embodiments of the present disclosure may provide high-efficiency extraction of valuable natural metabolites in plants, fungi, and organic animal bodies.

Embodiments of the present disclosure may provide high-throughput, high-yield extraction of organic compounds' (such as plants and fungi) primary metabolites (such as lipids, amino acids and proteins, glucides) and secondary metabolites (such as terpenoids, alkaloids, polyphenols).

Embodiments of the present disclosure may provide high-throughput, high-yield extraction of small molecule valuable metabolites from various sources of organic matter.

Embodiments of the present disclosure may meet demand in the natural products markets, including food, nutraceuticals, pharmaceuticals, wellness and cosmetic industries.

Embodiments of the present disclosure may enhance extraction yield and throughput in ultrasonic-assisted extraction systems.

Embodiments of the present disclosure may provide the opportunity to extract the different types of biomasses (such as seeds, roots, barks, leaves, mycelium, caps) and primary and secondary metabolites (such as oil, alkaloids, terpenoids, flavonoids).

Embodiments of the present disclosure may provide the opportunity to use different solvents by improvement of their extraction performance. These solvents may include but are not limited to ethanol, methanol, heptane, hexane, pentane, water, acetic acid, fumaric acid, dimethyl sulfoxide (DMSO), or any combination of one or more of these solvents. The solvent used may depend on the properties of the source material and/or the properties of the substance(s) to be extracted from the source material.

Embodiments of the present disclosure may enhance extraction of heat-sensitive components at high yield with no thermal degradation.

Embodiments of the present disclosure may reduce reliance on unpredictable factors such as residence time.

Embodiments of the present disclosure may improve reproducibility of extraction processes.

Embodiments of the present disclosure may avoid an unwanted increase in temperature induced by high energy ultrasonic cavitation field. In some embodiments, ultrasonic waves may be introduced into a chamber, thereby introducing additional energy into the chamber. This introduction of additional energy may raise the temperature of the chamber, which thereby presents the risk of destroying the desired substances that are being extracted from the source material. Furthermore, cavitation energy may raise the temperature within the chamber since heat is dissipated when cavity bubbles burst within the source material. Therefore, temperature control features such as but not limited to a temperature control circulating coil and vacuum isolation jackets devised in the annulus of the chamber may be implemented to prevent the temperature of the chamber from raising, thereby reducing the risk of destroying the substances of the source material.

Embodiments of the present disclosure may provide more efficient and direct delivery of ultrasonic power to a sample. This may take the form of multiple ultrasonic transducers configured around a perimeter of a lid of a chamber assembly, whereby the ultrasonic transducers generate ultrasonic waves that are directed towards a source material configured within a revolving drum of the chamber assembly.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1:
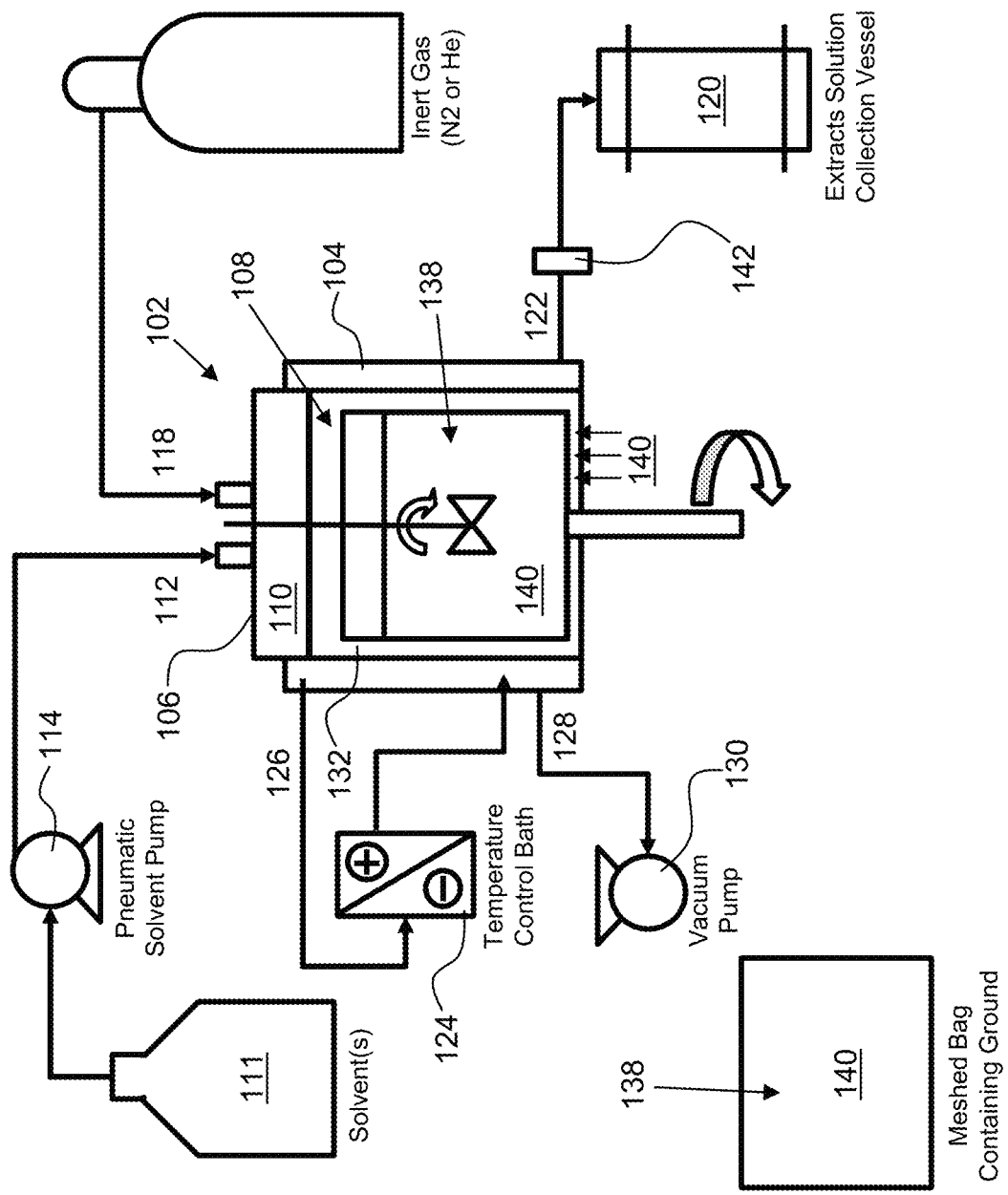
FIG. 1 is a schematic diagram of an extraction system according to some embodiments.

In some embodiments, systems and methods facilitate solid-in-liquid mass transfer to release valuable natural metabolites from the organic matter to non-flammable solvents through multiple physical and chemical mechanisms. Mechanisms can, in various embodiments, include ultrasonic chain detexturation, hybrid convective mixing, centrifugal agitation and separation, solid-liquid filtration, and temperature control.

Depending on where and how the target metabolites are located in the plants/fungi structural matrices, different physical mechanisms and mass transfer parameters can be engaged in extracting the active compounds.

In some embodiments, a computer-assisted control system determines a combination of the active parameters for achieving maximum extraction yield.

Depending on the complexity of vegetal/fungi matrices, type and value of metabolites, and choice of solvents, a computer-assisted control system incorporates a combination of the active parameters for achieving maximum yield. The control system can acquire measurement data from several sensors and analyze these data to optimize efficiency of the separation process based on the biomaterial.

Measurement sensors can be provided for the ultrasonic power and amplitude applied to the biomass, rotational speed and direction of the revolving drum, biomass solution temperature, isothermal jacket temperature, cooling/heating liquid temperature, extraction chamber pressure, feed solvent pH, the biomass solution pH, cumulated g-t (centrifugal acceleration-time, describing how much acceleration has been applied to the plant particles), mixer propeller's speed and direction, and the vibration sensor.

Control parameters can be defined, calibrated and optimized for different biomass, metabolite and solvent types and saved into the system as processing modes for automatic turnkey operations. The parameters can be based on the complexity of vegetal, fungi, and animal matrices, type and value of metabolites, and choice of solvents.

The control parameters may include parameters of the extraction process ("extraction parameters"). The extraction parameters may include but are not limited to the temperature of the contents of the chamber, the speed which the revolving drum and the mixing rod rotates, the frequency and amplitude of the ultrasonic waves, the time during which the source material is mixed, the time during which the source material is spun within the revolving drum, the time during which the inert gas jet produces bubbles, the time during which the ultrasonic waves are produced and exerted on the source material, the ratio of the time during which the ultrasonic waves are produced and exerted on the source material to the time during which the source material is mixed, intermittency of the time during which the ultrasonic waves are produced and exerted on the source material in comparison to the time during which the source material is mixed, and any other such ratios or intermittencies of time that the source material is acted on during the extraction process.

In some embodiments, the control parameters are optimized to extract 97% of target metabolites from a source material, or 95% of target metabolites from a source material, or 90% of target metabolites from a source material, or 80% of target metabolites from a source material, or 70% of target metabolites from a source material. Various example source material/substance combinations are described in Table 1 below. The control parameters may be set based on the type of source material being used, placement of the target metabolites in the source material and the type of substance(s) being extracted from the source material.

TABLE 1

Example Source Material/Substance Combinations

| Source Material | Substances Extracted from the Source Material |
|---|---|
| *Psilocybe* genus mushrooms, including but not limited to species such as *Psilocybe cubensis* | Psilocybin<br>Psilocin<br>Baeocystin<br>Norbaeocystin<br>Norpsilocin<br>Aeruginascin<br>Harmine<br>Harmaline<br>Harmane |
| *Gymnopilus* genus mushrooms, including but not limited to species such as *Gymnopilus purpuratus* | Psilocybin<br>Psilocin<br>Baeocystin |
| *Amanita* genus mushrooms, including but not limited to species such as *Amanita muscaria* | Muscimol<br>Muscarine |
| *Boletus* genus mushrooms, including but not limited to species such as *Boletus edulis* | Lycopene<br>Beta Carotene<br>Gallic Acid<br>Pyrogallol<br>2,4-dihydroxybenzoic acid<br>p-dihydroxybenzoic acid<br>Catechin |
| *Ganoderma* genus mushrooms, including but not limited to species such as *Ganoderma sichuanense* | Ganoderic acid<br>Ganoderenic acid<br>Ganoderiol<br>Lucidadiol<br>Ganodermadiol<br>Beta-glucan<br>Coumarin<br>Mannitol |
| *Trametes* genus mushrooms, including but not limited to species such as *Trametes versicolor* | Beta-1,3 glucan<br>Beta-1,4 glucan<br>Ergosta-7,22,dien-3Beta-ol<br>Fungisterol<br>Beta-sitosterol |
| *Inonotus* genus mushrooms, including but not limited to species such as *Inonotus obliquus* | Oxalate<br>Melanin<br>Phytosterols<br>Lanosterol<br>Betulinic acid<br>Betulin |
| *Mimosa* genus plants, including but not limited to species such as *Mimosa tenuiflora* | N,N-Dimethyltryptamine (DMT) |
| *Banisteriopsis* genus plants, including but not limited to species such as *Banisteriopsis caapi* (bark) | Harmine<br>Harmaline<br>Tetrahydroharmine<br>Harmol<br>Harmalol |
| *Peganum* genus plants, including but not limited to species such as *Peganum hHharmala* | Harmine<br>Harmaline<br>Tetrahydroharmine<br>Harmol<br>Harmalol |
| *Ephedra* genus plants, including but not limited to species such as *Ephedra sinica* | Ephedrine |
| Black Henbane (*Hyoscyamaus* genus plants, including but not limited to species such as *Hyoscyamus nNniger*) | Atropine<br>Scopolamine<br>Hyoscyamine<br>Tropane |
| *Catha* genus plants, including but not limited to species such as *Catha eEedulis* (Khat) | Cathinone<br>Cathine |
| *Crocus* genus plants, including but not limited to species such as *Crocus sSativusSaffron* | Crocin<br>Crocetin<br>Picocrocin<br>Safranal |

TABLE 1-continued

Example Source Material/Substance Combinations

| Source Material | Substances Extracted from the Source Material |
|---|---|
| *SceletiumMesembryanthemum* genus plants, including but not limited to species such as *Mesembryanthemum Ttortuosum* | Mesembrine<br>Mesembrenone<br>Mesembrenol<br>Tortuosamine<br>Chennaine |
| *Tabernanthe* genus plants, including but not limited to species such as *Tabernanthe iboga* | Ibogaine<br>Iboxygaine<br>Ibogaline<br>Alloibogaine<br>Catharanthine<br>Ibogamine<br>Noribogaine<br>Voacangine<br>Yohimbine<br>Hydroxyibogamine |
| *Voacanga* genus plants, including but not limited to species such as *Voacanga Africana* | Ibogaine<br>Voacangine<br>Voacamidine<br>Voacamine<br>Vincepotine<br>Vinblastine |
| *Anadenanthera* genus plants, including but not limited to species such as *Anadenanthera peregrina* | 2,9-dimethyltryptoline<br>2-methyltryptoline<br>5-MeO-DMT<br>5-Methoxy-N-methyltryptamine<br>Bufotenin<br>Bufotenin-oxide<br>Catechol<br>Leucoanthocyanin<br>Leucopelargonidol<br>N,N-Dimethyltryptamine (DMT)<br>N,N-Dimethyltryptamine oxide<br>N-Methyltryptamine<br>Orientin<br>Saponarentin<br>Viterine |
| *Diplopterys* genus plants, including but not limited to species such as *Diplopterys cabrerana* | N,N-Dimethyltryptamine (DMT)<br>5-MeO-DMT<br>N-methyltetrahydro-beta-carboline<br>Methyltryptamine<br>Bufotenin |
| *Mitragyna* genus plants, including but not limited to species such as *Mitragyna speciosa* | Mitragynine<br>Yohimbine<br>Voacangine<br>7-hydroxymitragynine<br>Raubasine<br>Corynantheidine<br>Mitraphylline<br>Rhynchophylline |
| *Lophophora* genus plants, including but not limited to species such as *Lophophora williamsii* | Mescaline<br>Lophophorine<br>Pellotine<br>Anhalonidine<br>Anhalidine<br>Anhalonine<br>Anhalamine<br>N-methylmescaline<br>Lophophine<br>Lobivine<br>Hordenine |
| *Echinopsis* genus plants, including but not limited to species such as *Echinopsis pachanoi* | Mescaline<br>3,4-dimethoxyphenethylamine<br>3-Methoxytyramine<br>4-hydroxy-3-methoxyphenethylamine<br>4-hydroxy-3,5-dimethoxyphenethylamine<br>Anhalonidine<br>Anhalinine<br>Hordenine |
| *Datura* genus plants, including but not limited to species such as *Datura stramonium* | Atropine<br>Hyoscyamine<br>Scopolamine |

TABLE 1-continued

Example Source Material/Substance Combinations

| Source Material | Substances Extracted from the Source Material |
|---|---|
| *Aconitum* genus plants, including but not limited to species such as *Aconitum fischeri* | Atropine<br>Hyoscyamine<br>Scopolamine |
| *Atropa* genus plants, including but not limited to species such as *Atropa belladonna* | Atropine<br>Hyoscyamine<br>Scopolamine |
| *Artemisia* genus planants, including but not limited to species such as *Artemisia vulgaris* | Vulgarin<br>Artemisinin<br>Scopoletin<br>Camphene<br>Camphor<br>Sabinene<br>Quercetin<br>Kaempferol |
| *Nymphaea* genus plants, including but not limited to species such as *Nymphaea nouchali* | Aporphine<br>Nuciferine |
| *Salvia* genus plants, including but not limited to species such as *Salvia divinorum* | Salvinorin A |
| *Phyllomedusa* genus animals, including but not limited to species such as *Phyllomedusa bicolor* | Deltorphin<br>Deltorphin I<br>Deltorphin II<br>Dermorphin |
| *Incilius* genus animals, including but not limited to species such as *Incilius alvarius* | 5-MeO-DMT<br>Bufotenin |
| *Bufo* genus animals, including but not limited to species such as *Bufo alvarius* | 5-MeO-DMT<br>Bufotenin |
| Tetrodontinae subfamily animals, including but not limited to species such as *Tetrodon ocellatus* | Anhydrotetrodotoxin<br>4-epitetrodotoxin |

In some embodiments, various extraction processes are integrated into one machine, enabling the operator to set up and run combinations of different extraction processes simultaneously.

Depending on the complexity of the organic matter matrices in a solid-liquid mixture and the extraction parameters, the ultrasonication described herein can activate different physical mechanisms. Active mechanisms in the case of plant, animal, and fungi extraction may include erosion, sonoporation, shear forces, fragmentation, capillary effect and detexturation. In certain embodiments, ultrasound engages one or more of these physical mechanisms while simultaneously causing solute thermolysis along with the formation of highly reactive radicals and reagents, such as hydroxyl radicals (—OH) and hydrogen peroxide ($H_2O_2$).

In some embodiments, an encapsulation material is applied in the extraction fluid. The extracted substance can be encapsulated by hydroxyl radical initiated covalent bonding and microsphere formation.

In some embodiments, systems and methods described herein provide enhanced mass transfer of metabolites, that reside deep in the vegetal/animal/fungal matrices, into a non-volatile designed solvent.

FIG. 1 illustrates one embodiment of an extraction system. The system provides for a non-volatile solvent tank, heat controller for an isothermal jacket, mesh bag in and out of the extraction system, the connection of inert gas for minimizing oxidation, and an exit of the extracted metabolites in solution into a collection tank.

System 100 includes extraction system 102. Extraction system 102 includes chamber assembly 104 and lid 106. Chamber assembly 104 defines chamber 108.

Lid 106 includes ultrasonic probe 110. Chamber 108 can receive the solvent from solvent supply tank 111 via solvent input port 112 through lid 106 by operation of pneumatic solvent pump 114. Chamber 108 can receive inert gas (e.g., $N_2$ or He) from inert gas supply tank 116 via gas input port 118 in lid 106. A mixture of solvent and other materials in solution can be introduced into chamber 108 can exit to collection vessel 120 by way of line 122.

Temperature control bath device 124 is coupled to chamber 108 by port 126 and port 128. Port 128 is also coupled to vacuum pump 130. Revolving drum 132 in chamber 108 is coupled to drive system 134. Revolving drum 132 can be a centrifuge spinning drum. Mixer 136 is mounted on lid 106.

System 100 includes filter 142. Filter 142 can filter solution exiting chamber 108 before the solution reaches collection vessel 120. In some embodiments, filter 142 removes ground biomass from the solution. In the diagram shown in FIG. 1, filter 142 is located in line 122. A filter can, however, be provided in other locations. For example, a filter can be located in chamber 108 near the exit to line 122.

System 100 includes gas injection system 144. As described below relative to FIG. 14, a gas injection system can include one or more jets that assist in floating of biomass.

Ground biomass 138 can be introduced into chamber 108 in mesh bag 140. Solvent can flow through chamber 108. Ultrasonic probe 110, mixer 136, and drive system 134 can be operated to extract substances from the ground biomass, such as primary and secondary metabolites. Extracted metabolites in solution exit chamber 108 and pass into collection vessel 120.

Raw material can have a major impact on extraction. In some examples, the organic material (plant, animal, or fungi) is ground to maximize the mass transfer area to solvent. In one example, mesh bag 140 is filled with ground biomass to one-third of its volume (around 5 to 10 lbs., depending on density) and placed in chamber 108. In other examples, mesh bag 140 is filled one quarter full, one half full, or completely full.

Extraction system 102 facilitates enhanced mass transfer of solid metabolites to the extraction solvent through ultrasonic chain detexturation, hybrid convective mixing, centrifugal separation, solid-liquid filtration, and temperature-controlled fluid property alterations. The primary extraction process can be based upon effective ultrasonic de-texturization of ground biomass to release the active metabolites to the solution and the effective separation of organic extracts from biomass.

System 100 may maximize throughput rate and yield of extraction. In one example, the probe includes a 1100 $cm^2$ ring shaped ultrasonic probe. In another example, the probe includes a 500 $cm^2$ ring shaped ultrasonic probe. In another example, the probe includes a ring shaped ultrasonic probe between 500-1100 $cm^2$. In another example, the probe includes an ultrasonic probe between 500-1100 $cm^2$ in the shape of a rod, a cone, a square, or any other shape. The ultrasonic probe may expand the ultrasonic cavity field, penetration depth, and ultrasonic intensity (IS). The ultrasonic probe may have an outer diameter that is 50% to 95%, inclusive of said values, of a corresponding inner diameter of the chamber. The outer diameter of the ultrasonic probe may be 75% to 100%, inclusive of said values, of a corresponding inner diameter of the revolving drum. The ultrasonic probe may be designed to cover the maximum area of the top surface of the source material, and therefore a circular shape of the ultrasonic probe matching a cylindrical shape of the chamber may be preferred.

In some embodiments, the ultrasonic probe may be configured on the sides of the chamber assembly. In these embodiments, the thermal controlling features may be configured on the top or bottom of the chamber assembly. These embodiments may allow for a greater area of the source material to be exposed to the ultrasonic waves, and therefore increase the effectiveness of the sonication.

An example of a ring-shaped ultrasonic probe is described below relative to FIG. 9. The ring-shaped ultrasonic probe may comprise ultrasonic transducers configured around a perimeter of the lid whereby the ultrasonic waves are directed towards the entire surface area of the source material that is exposed to the ultrasonic transducers within the revolving drum in the chamber. This extended arial sonication exposure allows a much larger portion of the source material to be impinged uniformly by the ultrasonic waves than if the ultrasonic probe was limited to a rod format sonicator. The ultrasonic transducers may be 100 W, 1500 W, 2500 W, 4500 W, or transducers of any wattage there in between. The transducers may contribute to the mixing of the source material by generating ultrasonic waves that cause oscillation in the portion of the source material closest to the ultrasonic transducers.

The ring-shape probe may maximize the ultrasonic power while minimizing the local ultrasonic intensity to apply a uniform cavitation field throughout the solution, with the help of the convective mixing mechanisms.

Figure 2:
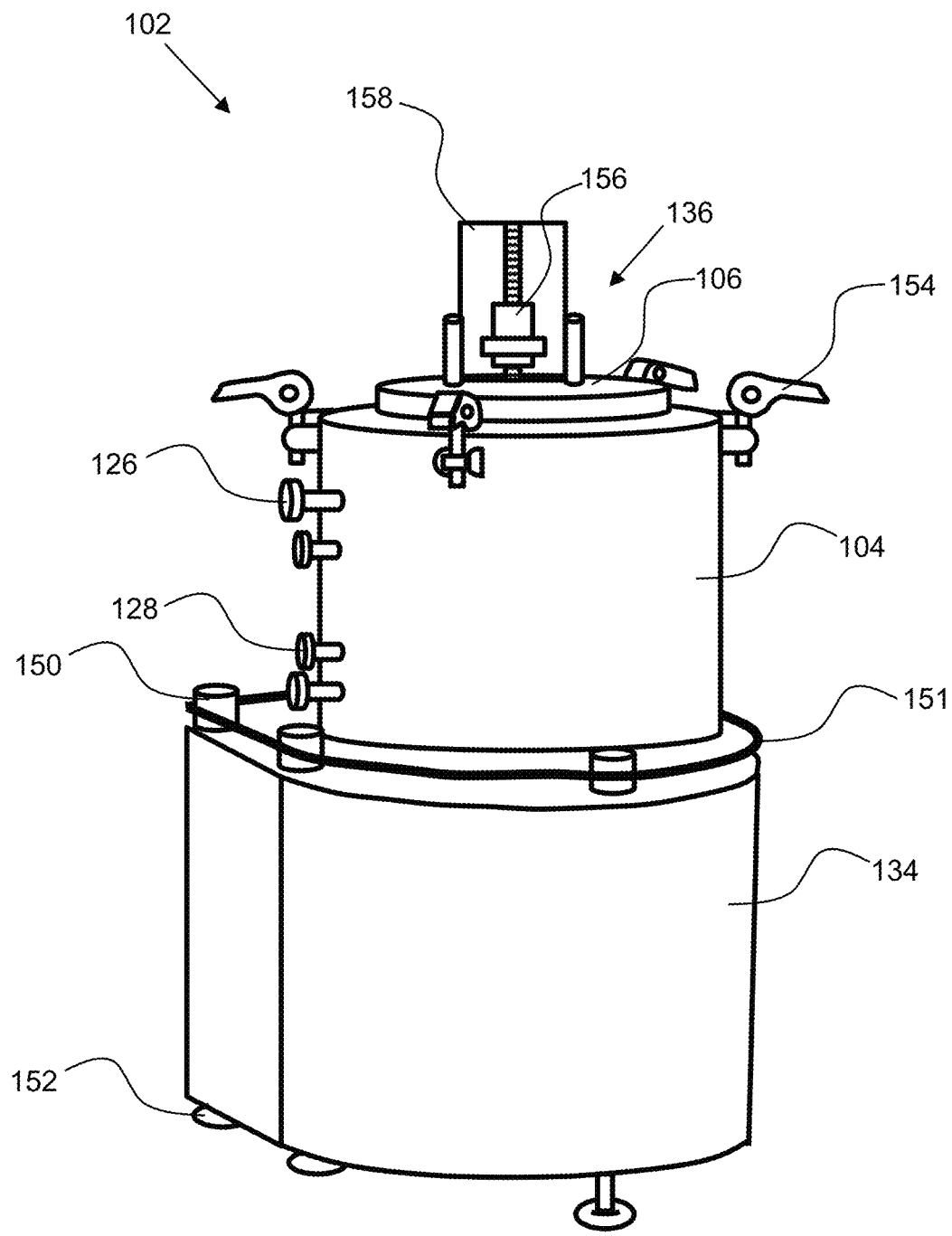
FIG. 2 is a front view of the extraction system with the ultrasound ring-shape probe devised on the extractor's closed lid.

FIG. 2 is a perspective front view of extraction system 102. The main housing and other components of chamber assembly 104 can be made of stainless steel. Chamber assembly 104 is mounted on drive system 134. The revolving drum system's vibration mass is isolated through at least five dampers 150 that are carried on the damping bottom plate 151. The chassis of the system sits on at least five adjustable jacks/dampers 152.

At least four clamps 154 air-tighten the system's lid 106. These clamps apply pressure to a lid o-ring, enabling the chamber to hold a pressure of 35 psi to 75 psi, inclusive of said values. The clamps applying pressure to the lid o-ring may enable the chamber to experience a leak rate of 0.6% to 1.5%, inclusive of said values, over 70% of the extraction process.

Mixer 136 includes motor 156 and rail system 158. Motor 156 can be an automatic motor. Motor 156 and rail system 158 are mounted on top of the lid 106. As further described below, automatic motor 156 and rail system 158 control when the stirring element of mixer 136 is inserted inside mesh bag 140 and when the stirring element gets pulled out from the mesh bag 140.

Figure 3:
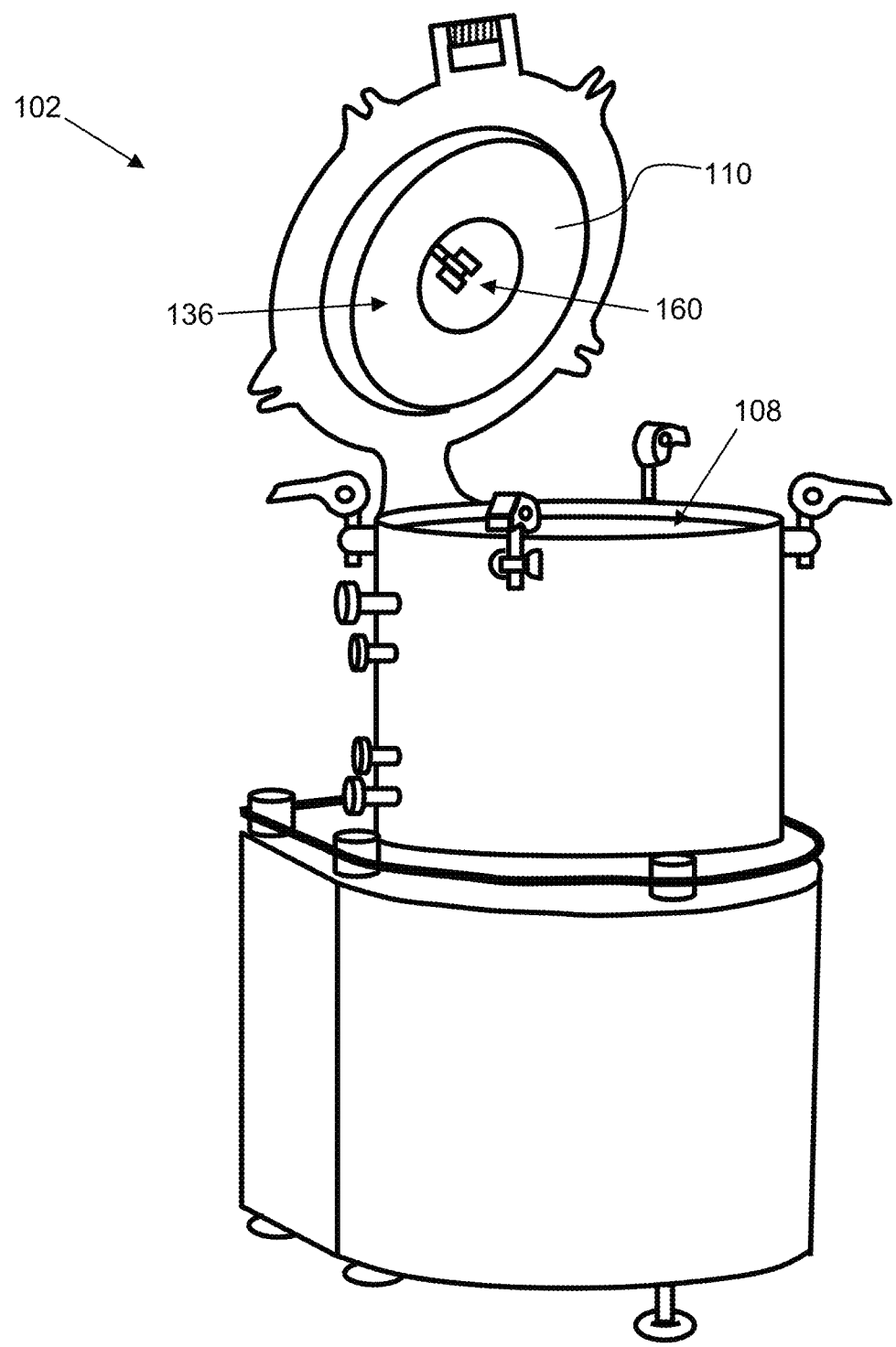
FIG. 3 illustrates the same front view as FIG. 2, with a bottom view of the ring-shape ultrasound probe and the moving solution mixer.

FIG. 3 illustrates the same perspective front view as FIG. 2, with a bottom view of the ultrasound ring-shape probe and the moving solution mixer. In this example, ultrasonic probe 110 is a ring-shape probe that fits the diameter of a revolving drum (shown in FIG. 4) inside chamber 108. Mixer 136 includes stirring propeller 160.

Figure 4:
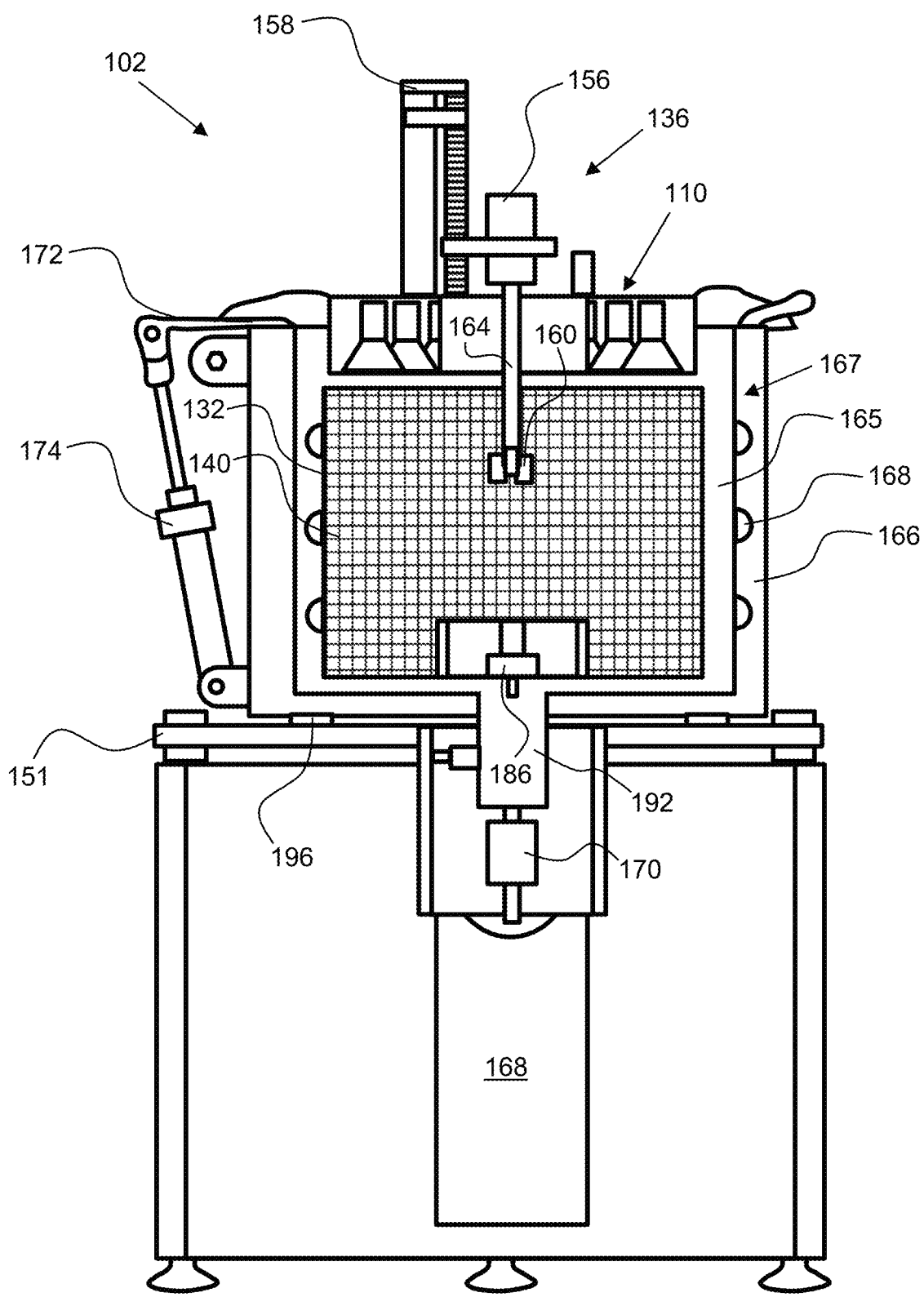
FIG. 4 illustrates a side cross sectional area of the extraction system with the mounted mesh bag in the centrifuge revolving drum and the mixer's position down inside the mesh bag.
Figure 4A:
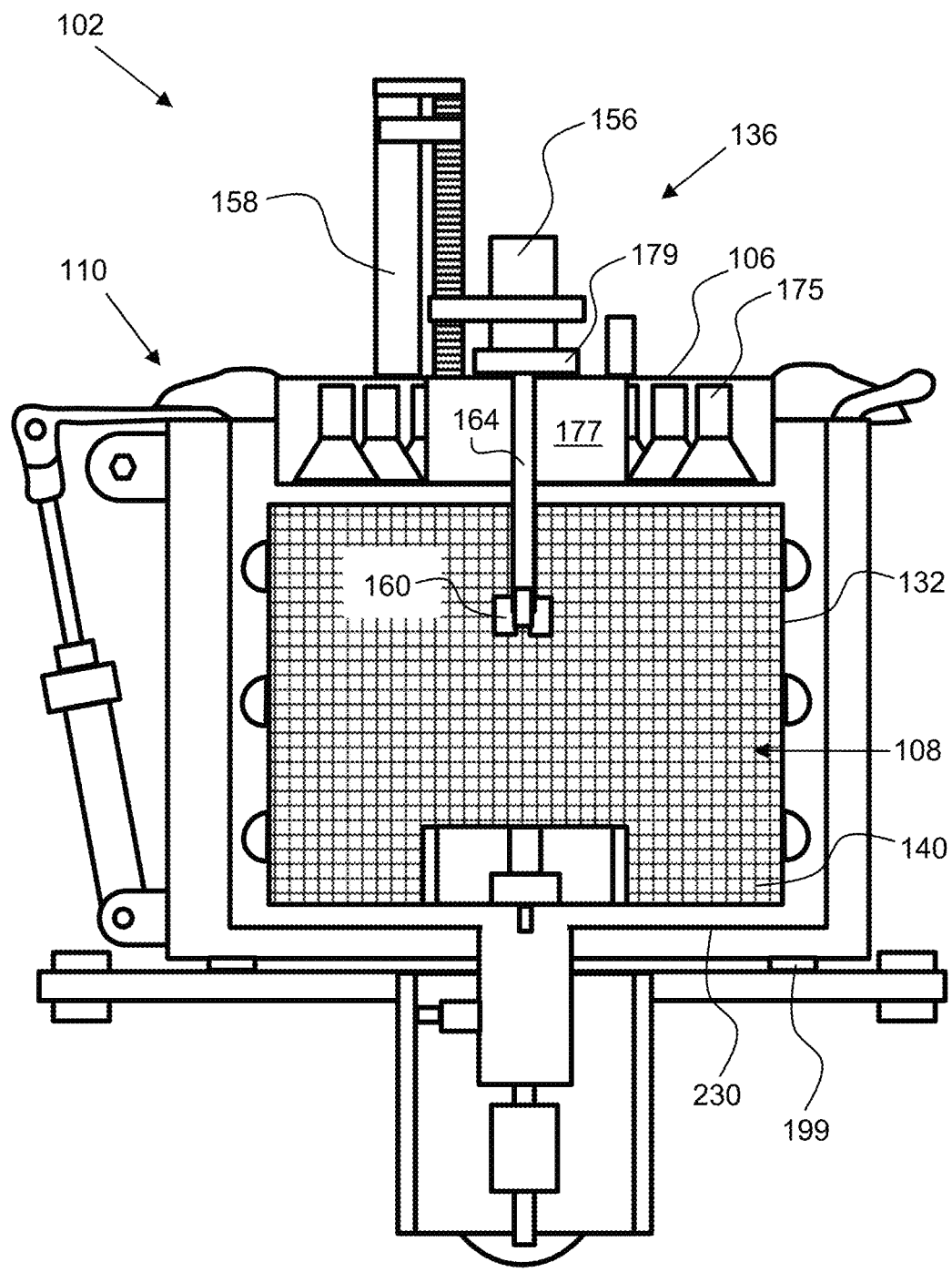
FIG. 4A is a detail cross sectional view of the chamber and lid of the extraction system shown in FIG. 4.
Figure 4B:
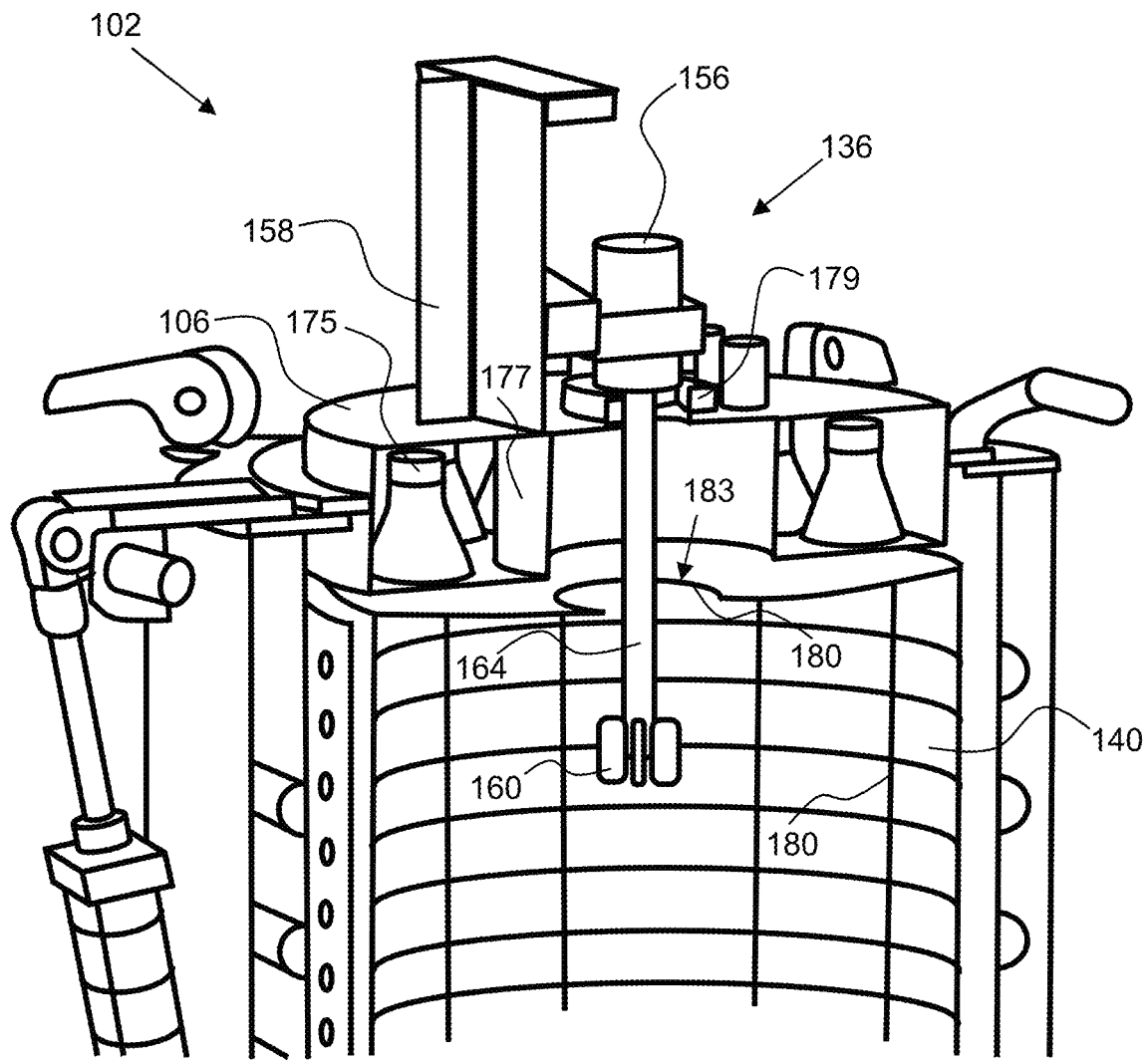
FIG. 4B is a perspective detail cross sectional view of the chamber and lid of the extraction system shown in FIG. 4.

FIG. 4 illustrates a side cross sectional view of the extraction system with the mounted mesh bag in the centrifuge revolving drum and the mixer's position down inside the mesh bag. FIG. 4A is a detail cross sectional view of the chamber and lid of the extraction system shown in FIG. 4. FIG. 4B is a perspective detail cross sectional view of the chamber and lid of the extraction system shown in FIG. 4. Mesh bag 140 rests in revolving drum 132. Mixer shaft 164 extends downwardly into the interior of mesh bag 140 through bag aperture 183. Stirring propeller 160 is at the end of mixer shaft 164. Drive system 134 includes motor 168 and drive coupler system 170. Drive system 134 is operable to rotate revolving drum 132.

Ultrasonic probe 110 includes transducers 175. Transducers 175 are enclosed in housing 177. Housing 177 is attached to lid 106. Bellows 179 may seal chamber 108 where the shaft of mixer 136 passes through lid 106. In FIG. 4A, bellows 179 are in a compressed state.

Although in FIG. 4, a direct drive system is shown, an extraction system can include other types of drive systems. For example, in alternate embodiments, an extraction system includes a belt drive system.

Chamber 108 can have an inner layer 165 and outer layer 166. The space 167 between the two co-concentric chamber layers contains a half-circular coil 168 for temperature control, welded to the body of the inner chamber.

A vacuum annulus space 167 between the two chamber walls minimizes the heat transfer across the chamber walls to/from the biomass. This embodiment has been designed with two embedded thermal jackets which enable the operator to activate either or both of the vacuum and cooling/heating circulating coil.

Revolving drum 132 can rotate at 500 rpm, 1000 rpm, 1500 rpm, 1800 rpm, 2200 rpm, or any range between and including the values provided, in drying mode. Revolving drum 132 is open from its top and is perforated on all other sides, including the radial and the bottom plate. The perforations may promote the radial flow of the solvent and the circulation of flow inside the chamber along with the rotations of the propeller and the revolving drum. 30% of the revolving drum's non-open surface area may be perforated. The revolving drum may be made of any material, including but not limited to 316 SS. Mesh bag 140 containing the ground biomass 138 can be mounted inside this chamber, acting as a compartment to trap the biomass inside.

The outer diameter of ultrasonic probe 110 can fit the inner diameter of the revolving drum. This may concentrate the ultrasonic waves and cavity field to the top of spinning drum 132, providing an extended surface for the ultrasonic energy transfer to the biomass.

The lid's hinge 172 and electric strut 174 allow the lid to open and close easily with the whole weight of the ultrasound probe 110 and the mixer's motor 156. Opening and closing of the lid can be done automatically by the control system.

Figure 5:
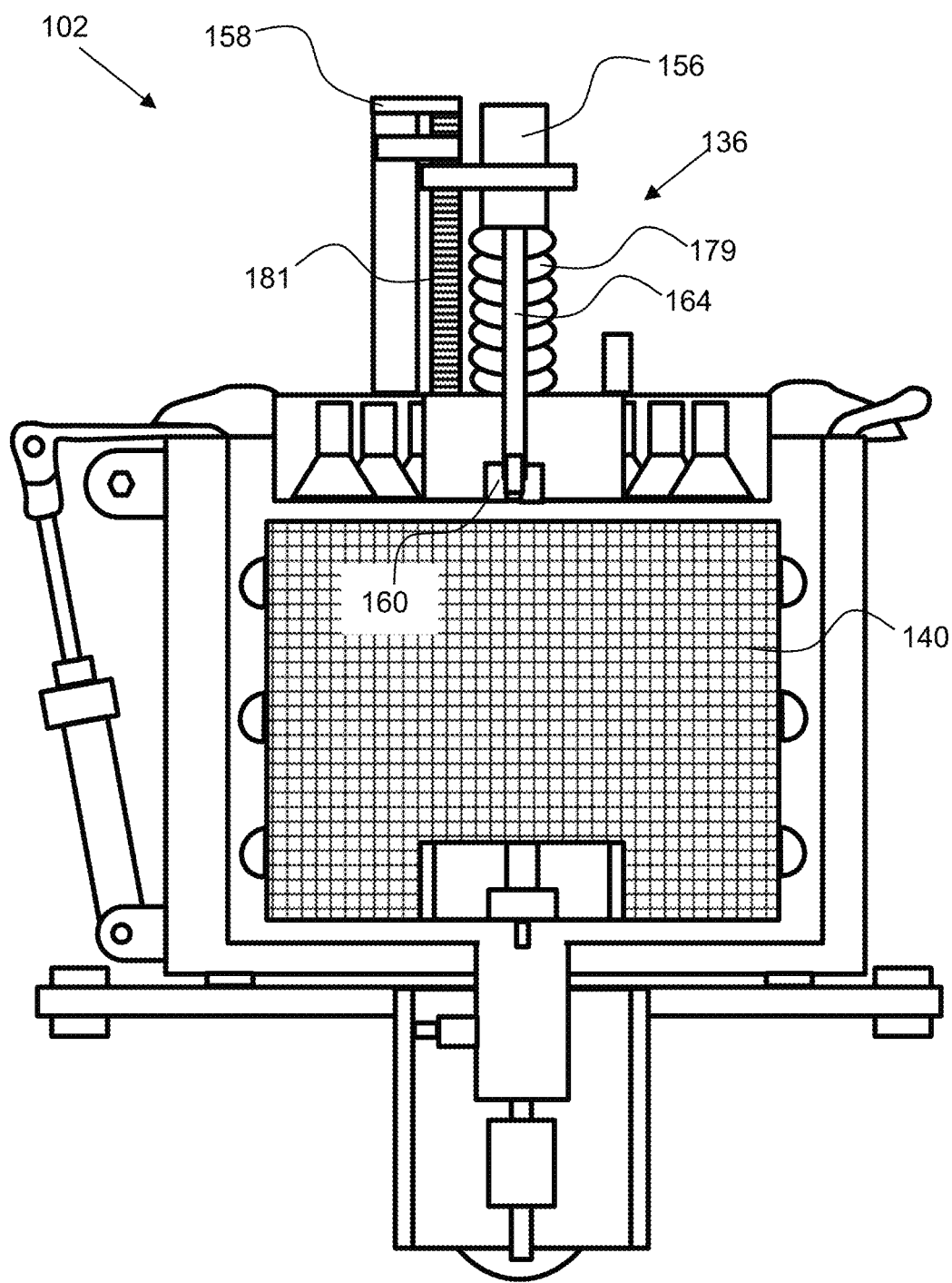
FIG. 5 illustrates the same view as FIG. 4 while the mixer's position is up outside the mesh bag.

FIG. 5 illustrates the same view as FIG. 4 but with the mixer's position up outside the mesh bag. Motor 156 is attached to a carriage 157 that can translate up and down on rail system 158. Flexible bellows 179 and linear guide 181 are provided on the top of lid 106. Motor 156 can be raised and lowered on rail 158. Thus, for example, in FIG. 5, motor 156 is shown in a raised position such that mixer shaft 164 and stirring element 160 are retracted from the interior volume of mesh bag 140. With motor 156 in the raised position, bellows 179 are expanded. Motor 156 can be a servo motor.

Figure 6A:
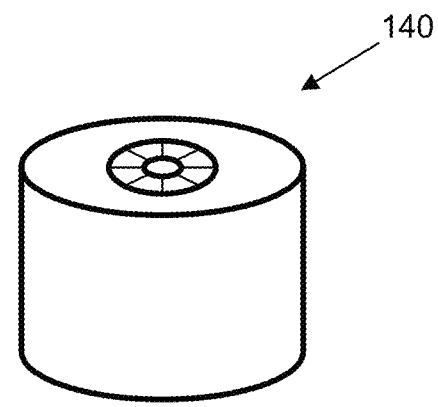
FIGS. 6A, 6B, and 6C illustrate a mesh bag from a side and top view, including a cross sectional side view.
Figure 6B:
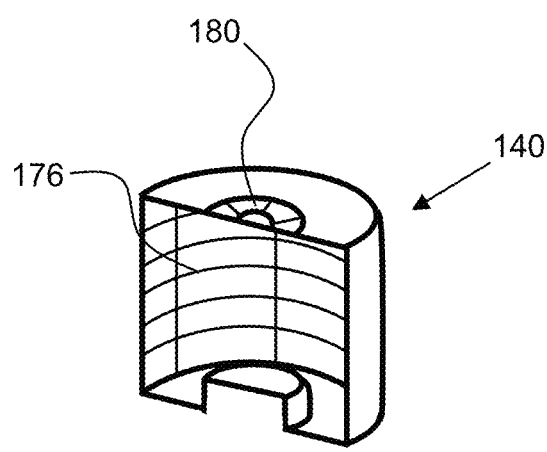
Figure 6C:
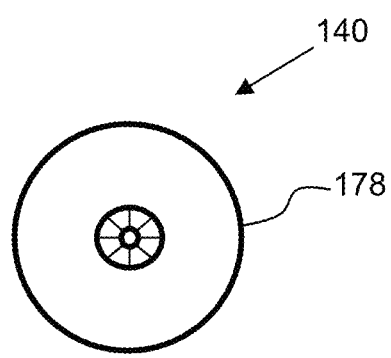

FIG. 6A illustrates the mesh bag from a side perspective view. FIG. 6B illustrates the mesh bag from a cross section view. FIG. 6C illustrates the mesh bag from a top view.

Mesh bag 140 can be a 400 size, or 200 size, or 50 size, or any size herein between cylindrical fabric mesh that houses a cylindrical stainless steel frame 176. Frame 176 sits inside the bag through a zipper 178 on one side of the bag. The bag has a hole in its top center that is covered by an intrudable plastic lid 180. This hole in the mesh bag allows mixer shaft 164 and stirring element 160 to get into the mesh bag 140.

Figure 7:
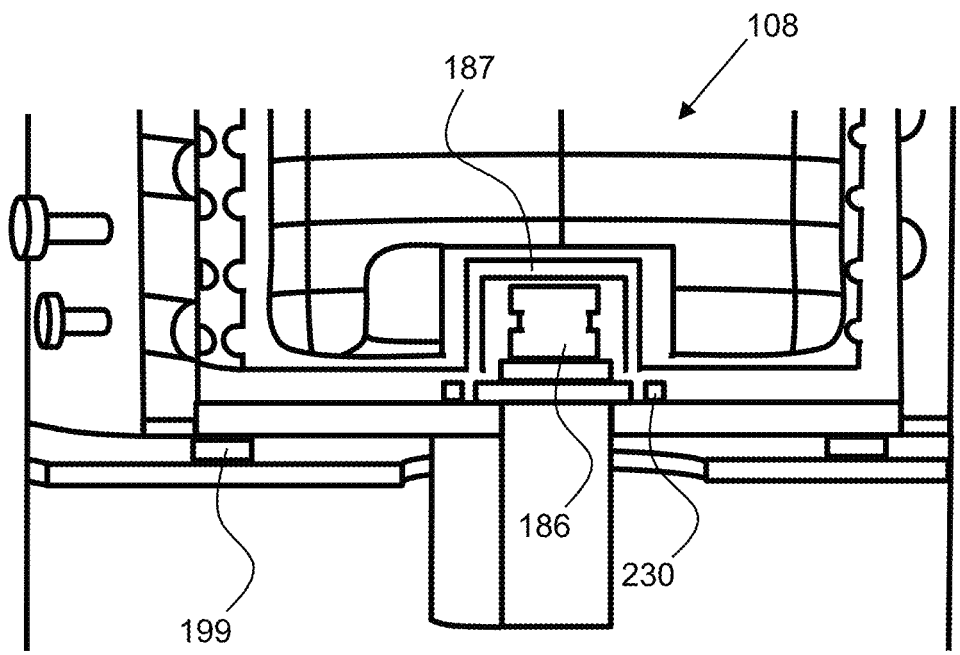
FIG. 7 illustrates a cross sectional view of the mechanical power transfer from the extraction system embodiment's main motor to the revolving drum. This Figure also shows the design of the vibration damping system.
Figure 7A:
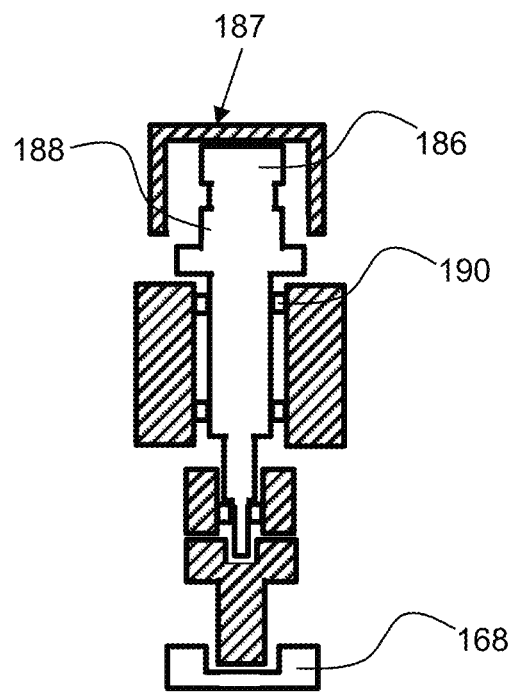
FIG. 7A is a detail cross sectional view of the drive system for the extraction system shown in FIG. 7.
Figure 7B:
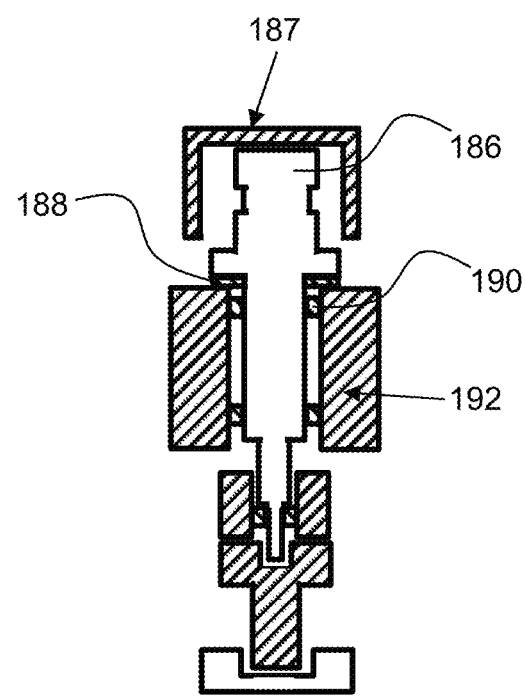
FIG. 7B is a detail cross sectional view illustrating a bearing assembly for the drive system in FIG. 7.

FIG. 7 illustrates a cross sectional view of the mechanical power transfer from the extraction system's main motor to the revolving drum. FIG. 7 also shows the design of the vibration damping system 182. FIG. 7A is a detail cross sectional view of the drive system for the extraction system shown in FIG. 7. FIG. 7B is a detail cross sectional view illustrating a bearing assembly for the drive system in FIG. 7.

The revolving drum 132 is connected to a direct drive motor through spinning shaft 186. A mechanical seal 188 seals the inside of the chamber from the bearings 190 and shaft box 192. In the example shown in FIG. 7, revolving drum 132 is connected to a direct drive motor 168 through a coupling hub 187 and spinning shaft 186. The shaft 186 is supported with two tapered roller bearings 190 which ensure the system can tolerate large unbalance forces. Unbalanced forces have been calculated according to ISO 1940. For centrifuges, it is recommended to use Grade 6.3 (G 6.3) mm/sec for a life factor and speed factor of a minimum of 4000 to 12000 hours, inclusive of said values.

The system can be designed according to sanitary and fire hazardous standards. To avoid noise and system vibration during the centrifugal drying process, at least five high-damping silicon isolators (vibration dampers) 150 with proper stiffness and damping capacity can be included. At least five leveling jacks are used to level the system chassis on the ground. The vibration dampers may have an axial stiffness of 0.7 N/m. The vibration dampers may have a radial stiffness of 0.8 N/m. The vibration dampers may provide axial damping of 2.4 N·sec/m. The vibration dampers may provide radial damping of 2.6 N·sec/m.

FIG. 7 also shows how port 126 is connected to the coil 168 and how port 128 is connected to the thermal annulus space to create thermal isolation. In this example, the system is only jacketed in a radial direction and may not have jackets on the top and bottom of the chamber. However, to minimize heat transfer from the bottom plate, a thin space 196 is provided between the bottom plate 151 and the bottom 198 of the chamber 108 that allows to minimize the heat transfer due to air's low heat transfer coefficient. The connection to the drive system top plate can also be insulated with spacers 199 (spacers 199 are also shown in FIG. 4A), which can be made of a thermally insulating material.

Figure 8:
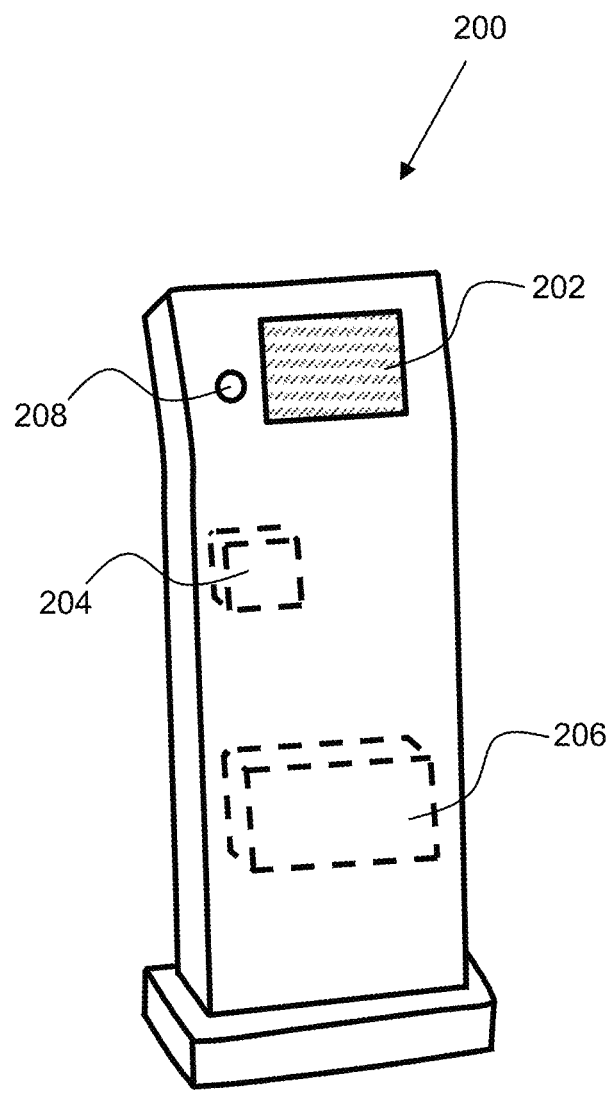
FIG. 8 illustrates the control system including a programmable human-machine interface (HMI), the programmable logic controller (PLC), and the ultrasound power generator.

FIG. 8 illustrates control system 200 including a programmable human-machine interface (HMI) 202, a programmable logic controller (PLC) 204, ultrasound power generator 206, and emergency stop 208. Control system 200 can be coupled to an extraction system, such as extraction system 102 described above with respect to FIG. 2. Control system 200 can perform computations to determine extraction processes to be performed using the extraction system, and control execution of such processes. For example, based on the substance to be extracted, the source material, and other factors, control system 200 can perform computations to determine which mechanisms are to be used and the parameters of each process, including sequence, duration, ultrasonic intensity, temperature control, filtering, solvent-type, and other parameters.

Figure 9:
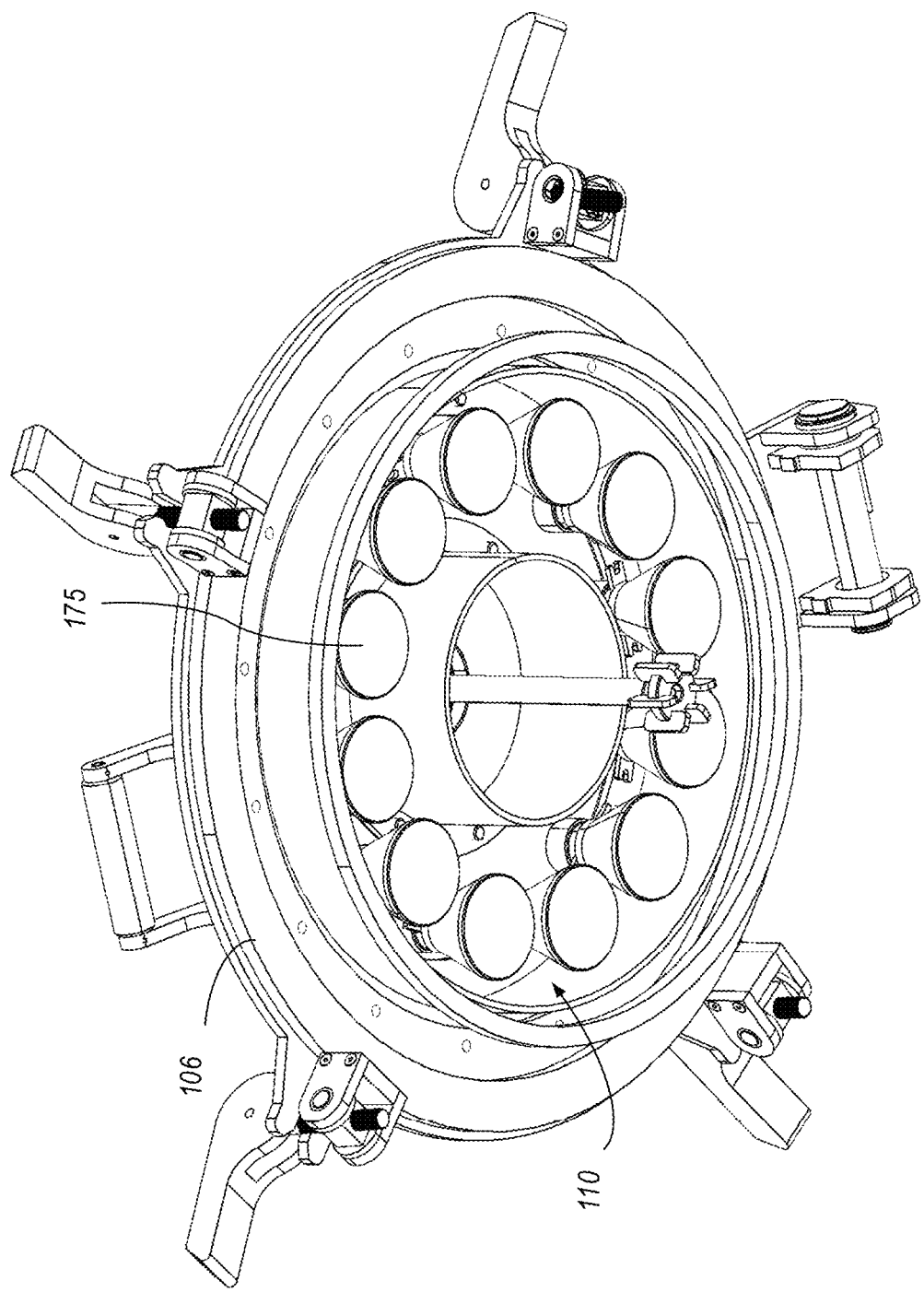
FIG. 9 illustrates one example of an ultrasonic ring-shape probe.

FIG. 9 illustrates one example of an ultrasonic probe. Transducers 175 can be arrayed around the circumference of the revolving drum. In the example shown in FIG. 9, ultrasonic probe 110 includes 12 transducers. In another embodiment, the ultrasonic probe includes 16 piezoelectric transducers, each of the 16 piezoelectric transducers giving 2.4 KW of power to the ultrasonic plate. In other embodiments, an ultrasonic probe may have other numbers of transducers, at other power levels. The transducers may give 100 W to 4500 W of power, inclusive of said values, to the ultrasonic plate.

Figure 10:
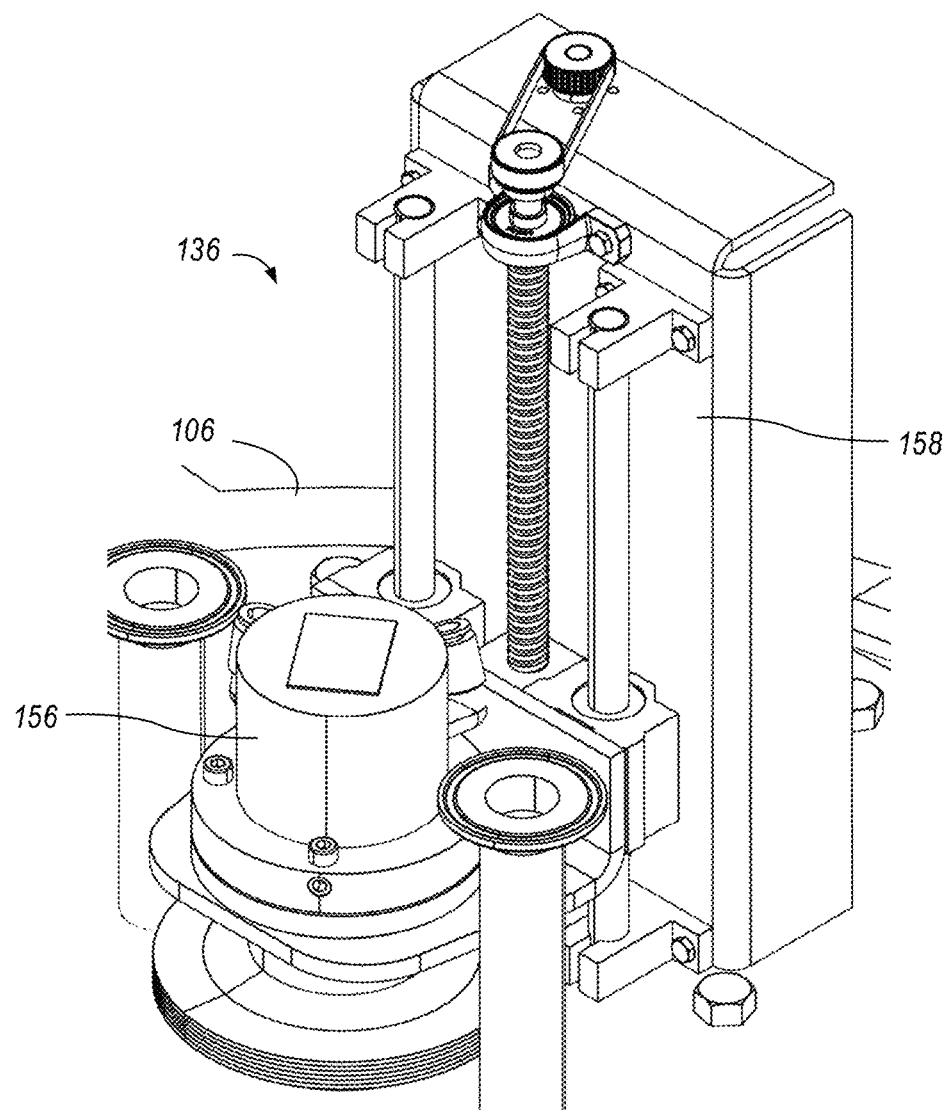
FIG. 10 is a perspective view of a mixer from outside the extraction system.

FIG. 10 is a perspective view of a mixer from outside the extraction system. Mixer 136 includes motor 156 and rail system 158 on top of lid 106. Rail system 158 is operated to control when the mixer gets inside the mesh, and when mixer gets pulled out from the mesh bag 140.

Figure 11:
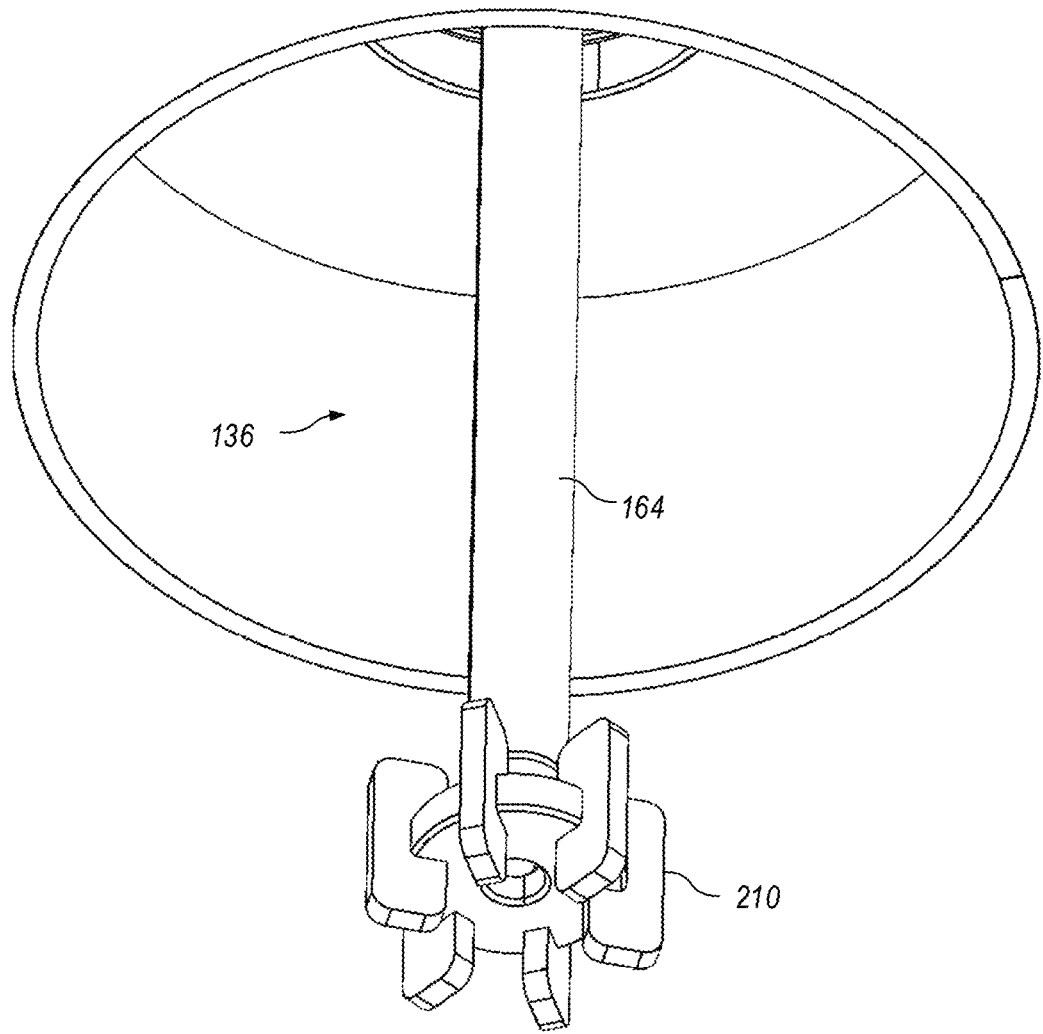
FIG. 11 is a perspective view of a mixer from inside the extraction system.

FIG. 11 is a perspective view of a mixer from inside the extraction system. Mixer 136 includes mixer rod 164 and propeller 210. In this example, propeller 210 serves as a stirring element for mixer 136. In one embodiment, propeller 210 is folded when propeller 210 does not turn and then expands (e.g., unfolds) when it is turning. Mixer 136 passes through the center of the lid 106 and ring-shaped ultrasonic probe 110 (see FIG. 9).

Figure 12A:
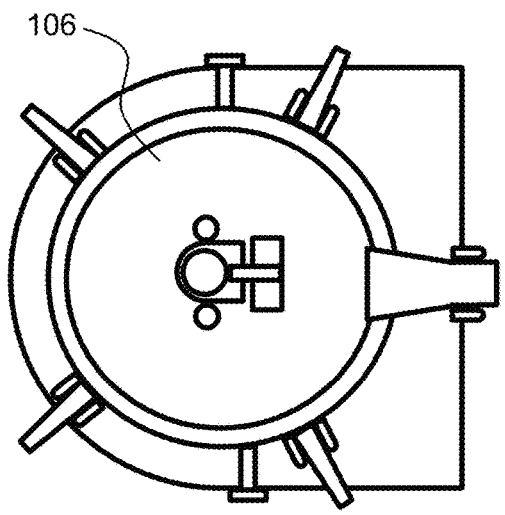
FIG. 12A illustrates the top view of the extraction system when the lid is closed.
Figure 12B:
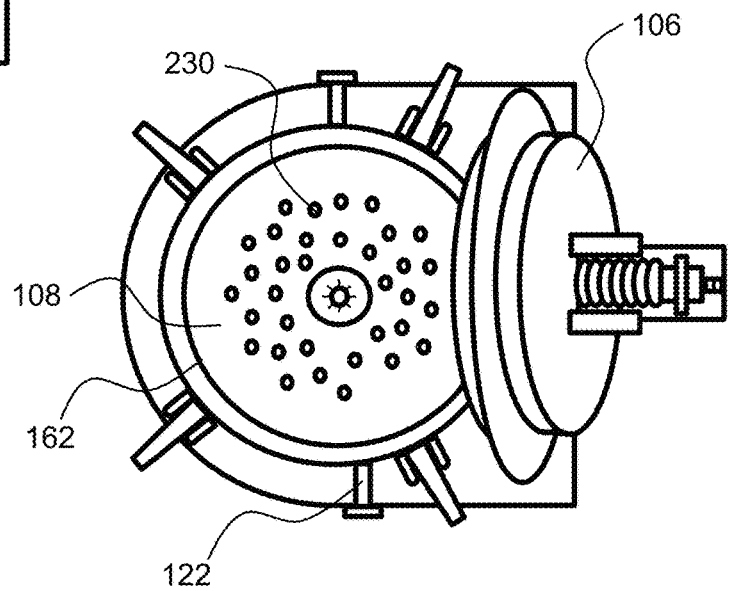
FIG. 12B illustrates the top view of the extraction system when the lid is open and the spinning drum is empty.
Figure 12C:
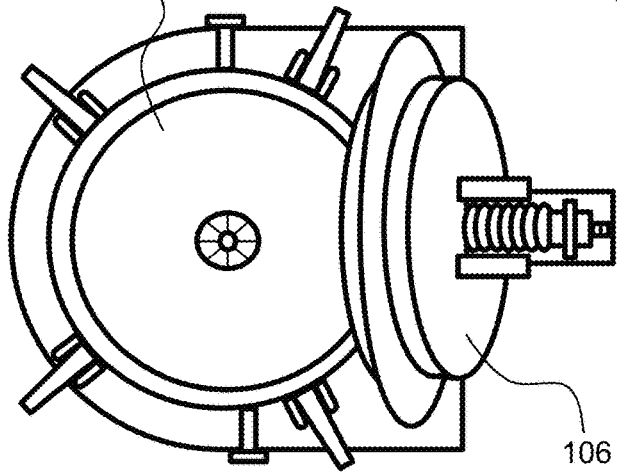
FIG. 12C illustrates the top view of the extraction system when the lid is open and the mesh bag is mounted.

FIG. 12A illustrates the top view of the extraction system when the lid is closed. FIG. 12B illustrates the top view of the extraction system when the lid is open and the revolving drum is empty. FIG. 12C illustrates the top view of the extraction system when the lid is open and the mesh bag is mounted.

Initially, the chamber is empty (FIG. 12B). For the process to start, the loaded mesh bag is mounted inside the chamber (FIG. 12C). Then the lid is closed and tightened (FIG. 12A). Then as illustrated in FIG. 1, the system is flushed by inert gas to push out the oxygen on the gas cap above the solvent inside the closed chamber. There are two input/output ports on top of the lid. Then the system can be filled with the solvent (pure or combination of solvents) all the way to the level where the ultrasound probe surface is submerged inside the solvent. This is to ensure that the ultrasonic waves are produced and emitted inside the solvent fluid. The thermal jacket outer space 167 is vacuumed and the coil is connected to a circulating bath 124 to keep the temperature of the solvent constant. The outlet 122 is closed with a valve and the system is ready for active extraction and separation.

Figure 13:
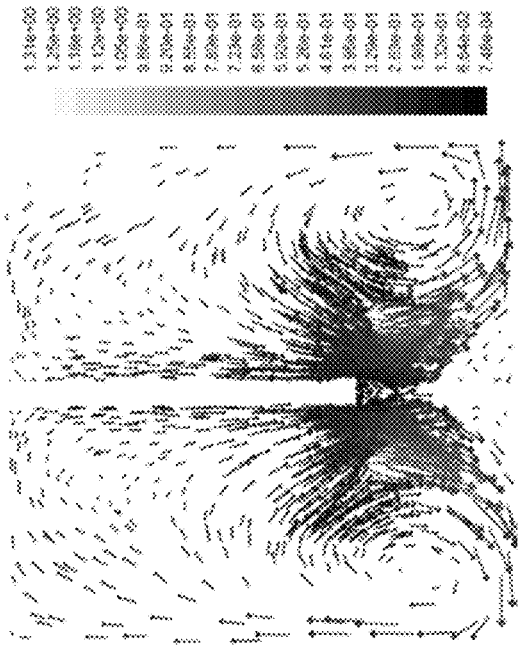
FIG. 13 is a diagram illustrating flow produced by a mixing propeller in a chamber of an extraction system.
Figure 13:
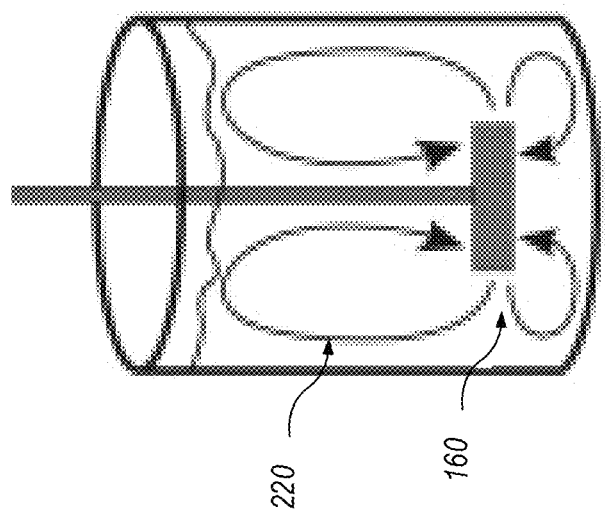

Control system 200 can move the mixing propeller axially through the process to maximize the solution homogeneity and ensure optimal ultrasonic exposure to the plant material. The mixing propeller can be an axial pitched blade turbine to provide axial motion to the fluid flow during the ultrasonication process. FIG. 13 is a diagram illustrating flow produced by a mixing propeller in a chamber of an extraction system. Propeller 160 can be rotated to produce flow in the directions of lines 220.

The control system can control the axial movement of the mixer in three modes: i) to enter the meshed bag for biomass homogenized mixing during the ultrasonication process, ii) to move up and down inside the meshed bag and during the sonication process to optimize the convective mixing regime, in conjunction with the convective mixing due to the revolving drum rotations, iii) to leave the meshed bag during the centrifugal drying process.

In some embodiments, gas is introduced to assist promote floating of the biomass in the chamber. Operation of the one or more jets can allow for assisted floating of the biomass. In one example, introduction of the gas occurs right before sonication and in conjunction with the mixing.

Figure 14:
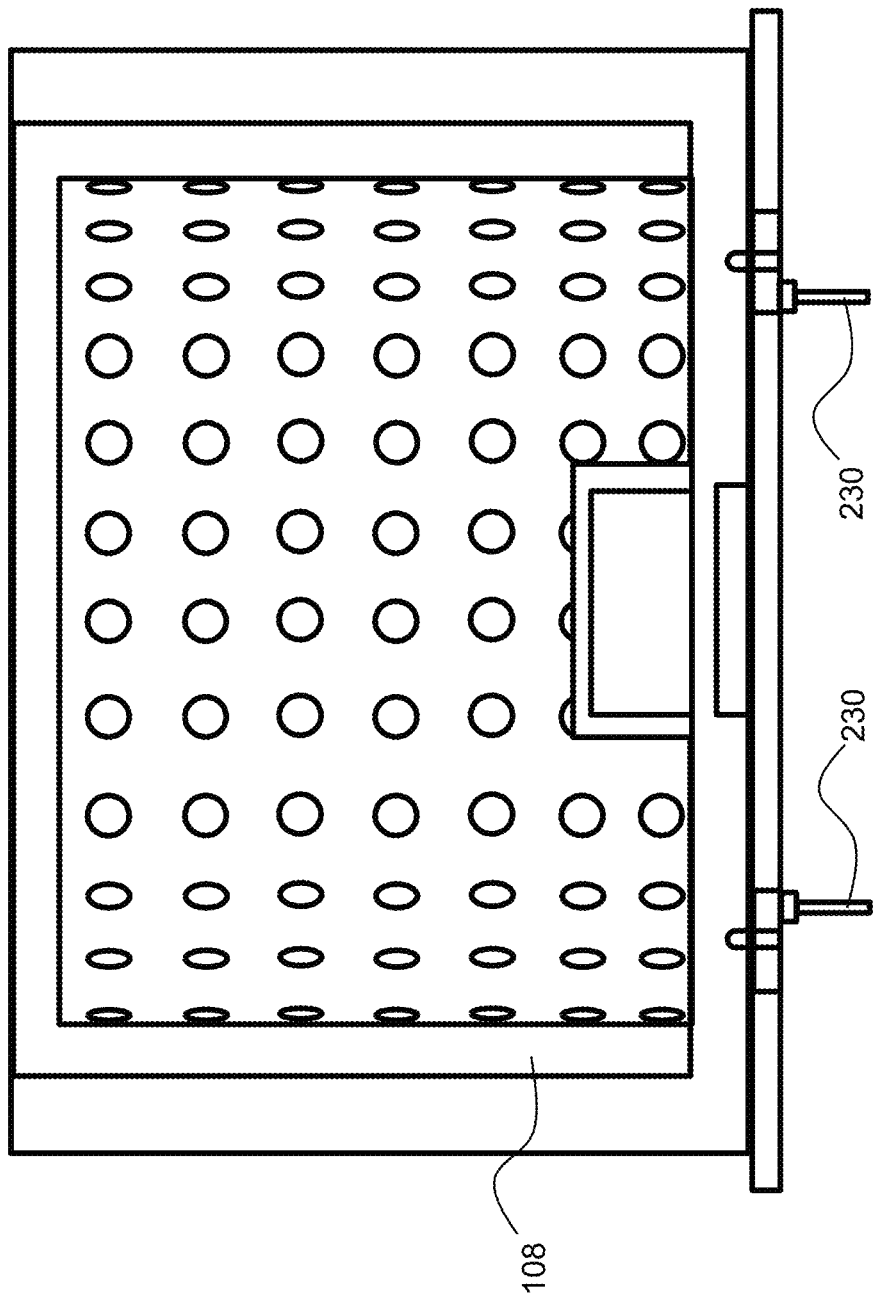
FIG. 14 is a cross-sectional side view side view of an extraction system including jets to promote biomass floating.

In one embodiment, to avoid the biomass precipitating at the bottom of the meshed bag and to improve the axial mixing flow of the biomass solution during the ultrasonication process, four gas bubble jet nozzles are configured on the chamber assembly. FIG. 14 is a cross-sectional side view side view of an extraction system including jets to promote biomass floating (see also FIG. 12B for a top view). Jets 230 are provided at the bottom of the chamber plate, which jet inert gas bubbles to the revolving chamber to float the precipitated biomass axially upward for proper exposure to the ultrasonic cavitation field. In one embodiment, the system includes for jet nozzles.

System operation can be controlled with a smart control system (such as control system 200 shown in FIG. 8) which receives and processes the data from the system's multiple sensors. Based on the type of metabolite extraction and biomass, the control system receives input data from the operator through a Human Machine Interface (HMI) system. Based on the real-time sensors data and the imported extraction parameters, the control system conducts fully automated different extraction scenarios on the biomass.

Figure 15:
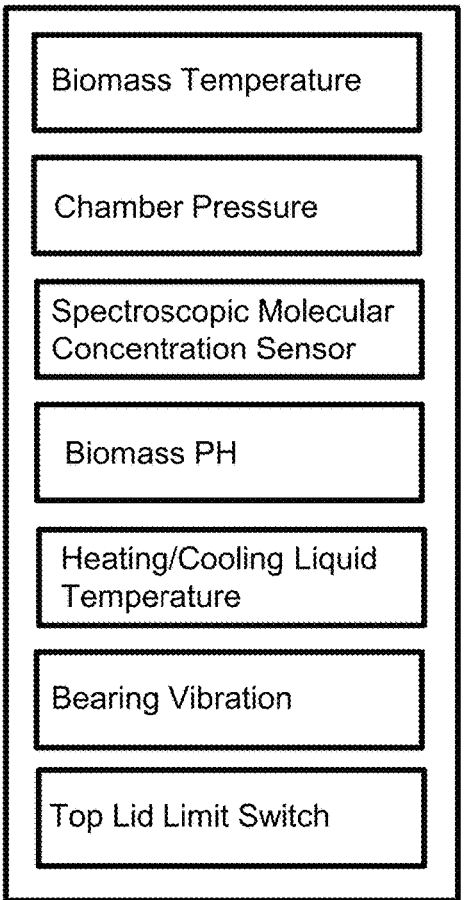
FIG. 15 illustrates sensor inputs and outputs of a control system.
Figure 15:
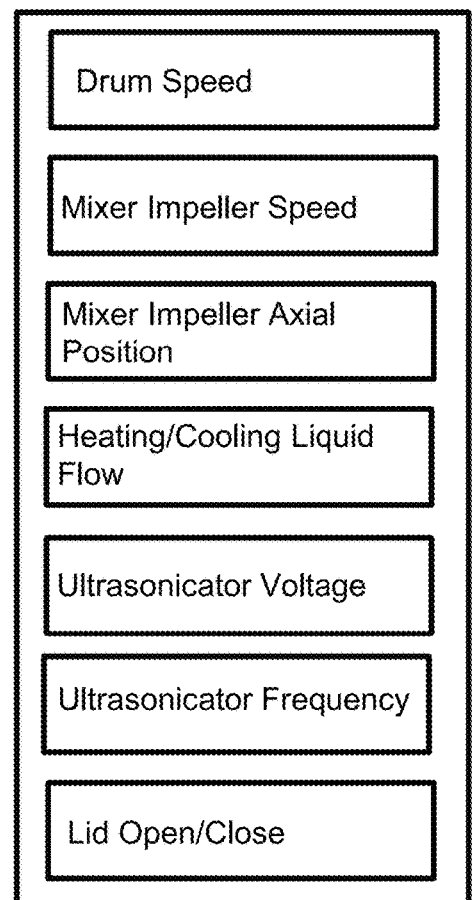
Figure 15:
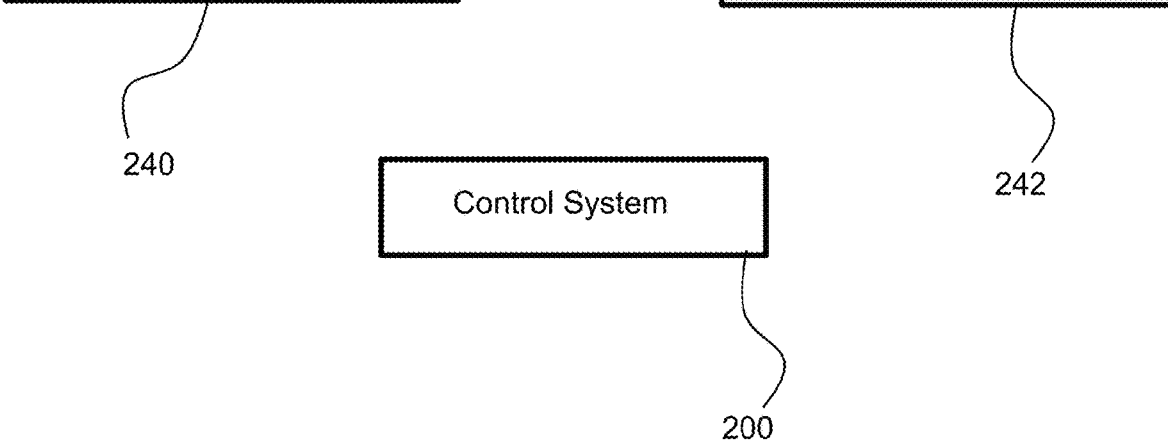

FIG. 15 illustrates sensor inputs and outputs of a control system. Control system 200 receives inputs 240 and generates outputs 242. Outputs 242 can be used to perform extraction of organic substances, including metabolites, such as described herein.

Figure 16:
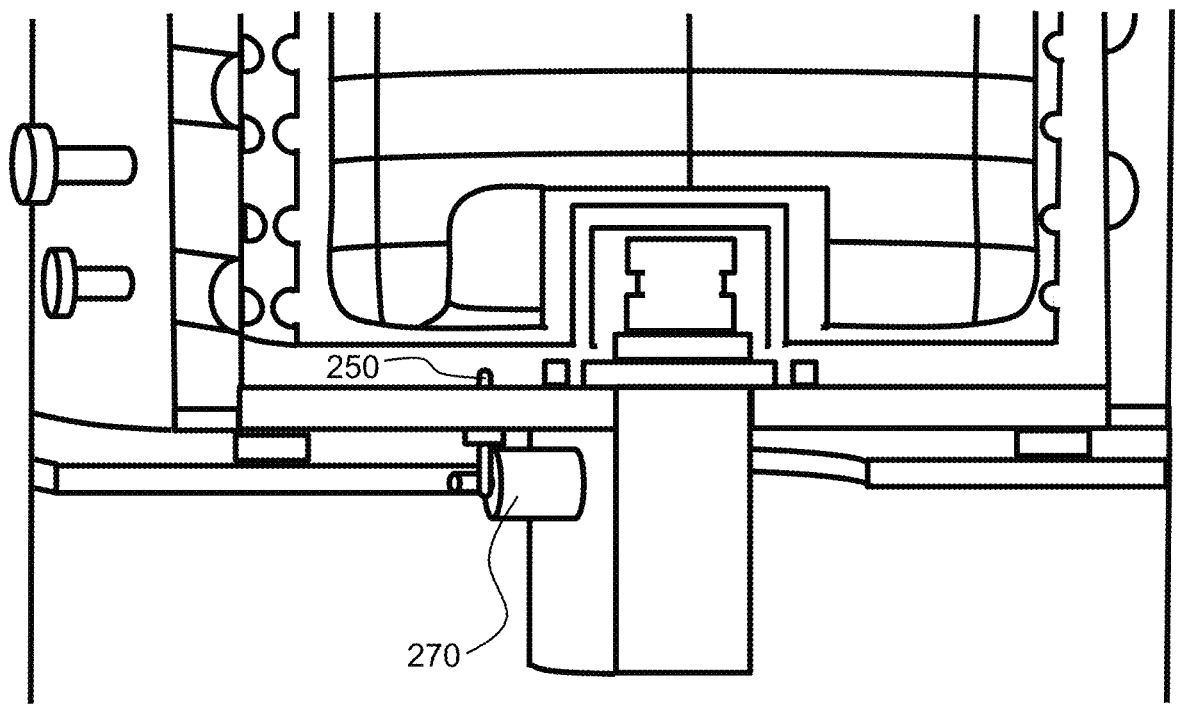
FIG. 16 illustrates one example of an extraction system including thermocouples.
Figure 17:
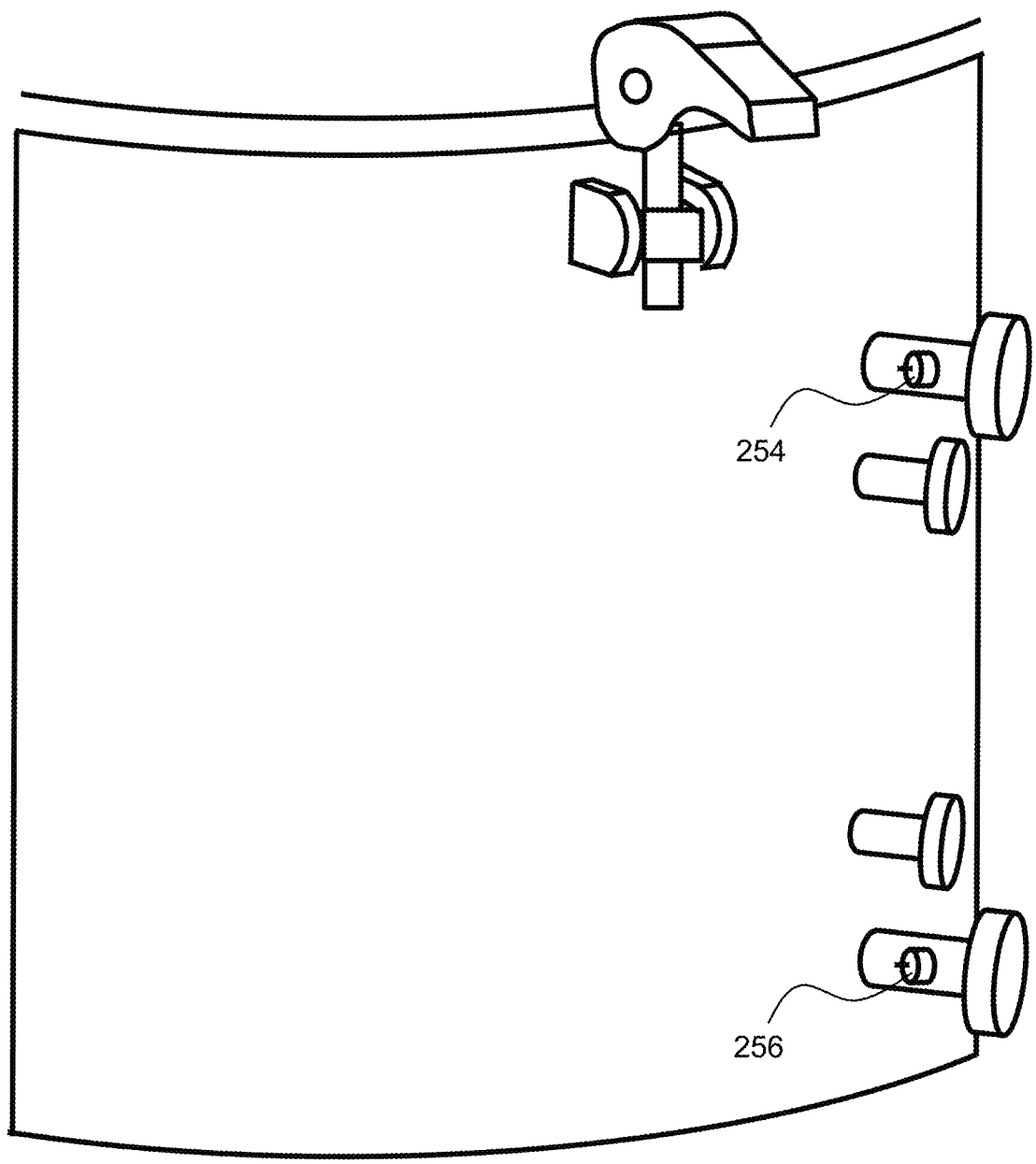
FIG. 17 illustrates thermocouples on the inlet and outlets of a heating/cooling circulating coil.

In one embodiment, the system's real-time temperatures are recorded with four thermocouples. FIG. 16 illustrates one example of an extraction system including thermocouples. One thermocouple 250 is located at the bottom of the chamber and reads the temperature of the solution in the chamber 108. Another thermocouple is located on the outside wall of the chamber and reads the temperature of the chamber's interface with ambient temperature. As shown in FIG. 17, there are two additional thermocouples 254 and 256 on the inlet and outlets of the heating/cooling circulating coil.

Figure 18:
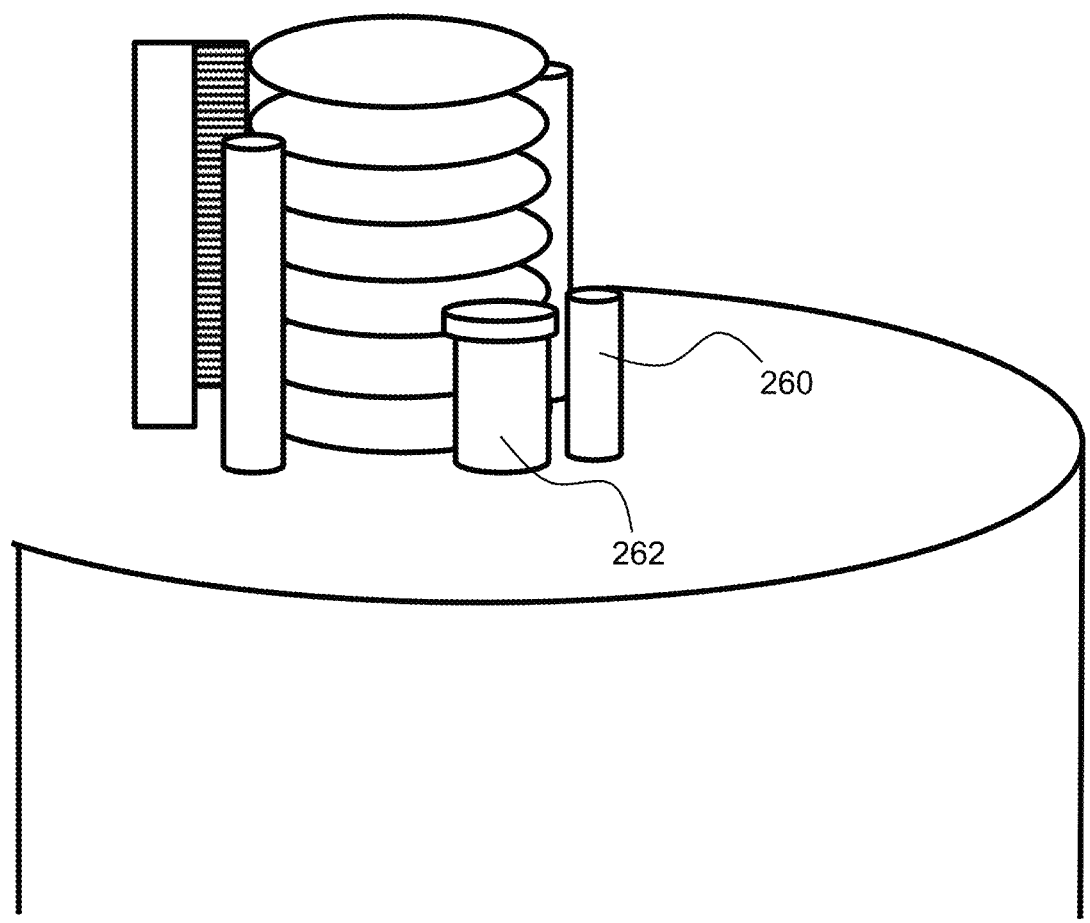
FIG. 18 illustrates a digital pressure transducer included on the lid of an extraction system.

In some embodiments, the system includes a pressure transducer. FIG. 18 illustrates a digital pressure transducer 260 included on lid 106 of extraction system 102. A mechanical safety pressure valve 262 is also included on lid 106 to ensure the safety pressure of the system.

Referring again to FIG. 16, in some embodiments, a vibration sensor 270 is included on the bearing gear box. The vibration sensor can be a piezoelectric vibration acceleration transducer. Vibration sensor 270 closely records and monitors the system's vibration and warns the operator and shuts down the system in the case of uneven distribution of biomass in the drum. The control system also reads input data from the main motor (RPM, direction of the rotation) and also the servo motor (location of the mixing shaft, speed of mixing) and from one pH sensor inside the chamber.

Extraction system 102 can also include a top lid limit switch. The limit switch can be used for safety and controls the electric strut connected to the hinge, for keeping the lid locked for safety or for opening the lid when the process is completed.

The extraction procedure for a specific metabolite, biomass and choice of solvent(s) can be defined based on single or multiple cycles of ultrasonication, convective mixing and centrifugal separation with different drum speeds, ultrasonication power in each phase and control temperature. The control system can automatically execute these processes when the extraction parameters are imported into the automated control program.

The ultrasonic detexturation provides access to the valuable metabolites deep inside the organic matter. The process is based on uniform sonication of the biomass and a designed flow inside the spinning chamber such that the whole biomass gets homogenous access to the ultrasonic cavitation field. For this, the mixer on the lid gets down inside the mesh bag. As noted above, a propeller 210 (for example, propeller 210 shown in FIG. 11) can be folded when it does not turn and can expand when turning. This mitigates the risk of mechanical failure during the high RPM centrifugal drying phase.

The mixing allows the biomass not to precipitate at the bottom of the mesh bag 140. The mixing can be optimized based on the height and rpm of the mixer, coupled with the bidirectional rotation of the revolving drum 162 at rpms up to 3 or up to 5 or up to 15. This way, the biomass particles' mass transfer area is maximized and uniform access for all solid particles is secured for having access to the ultrasonic cavity field.

Depending on parameters for ultrasonic detexturation (power, amplitude, frequency, and reactor design), solvent type (viscosity, pH, surface tension and solvent properties), biomass material (moisture, particle size, localization of metabolites, gland structure, texture, hardness, degree of processing) and extraction (sustainability, degradation, solvent trace), the ultrasonication extraction process is defined for each organic matter and desired valuable substance. When the extraction is complete, the chamber's exit port 122 is opened for the solution to be depleted into a collection vessel. To maximize the extraction of all the active metabolites and solvent, the mixer is pulled up at this stage and the centripetal force pushes all the extracted matter and solvent out of biomass.

In certain embodiments, the system performs alternate cycles of ultrasound and mixing.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A system for extracting substances from a source material, comprising:
- a chamber assembly defining a chamber, wherein the chamber is configured to hold source material and a solvent such that the source material is immersed in the solvent, wherein the chamber comprises and open end and a closed end;
- a lid configured at the open end of the chamber, wherein the lid is configured to cover the chamber;
- ultrasonic transducers configured to produce ultrasonic waves that impinge on at least a portion of the source material in the solvent, wherein the ultrasonic transducers are configured on the lid whereby the ultrasonic waves are directed into the chamber;
- jets configured at the closed end of the chamber, wherein the jets are configured to produce bubbles, wherein the bubbles are directed towards the source material;
- a mixer configured to homogenize and disperse at least a portion of the source material in solvent, the mixer comprising:
  - a shaft;
  - a stirring element; and
- a bag configured within the chamber, the bag comprising an opening;
- wherein the source material is configured within the bag within the chamber, wherein the mixer is configured to extend from the lid into the bag, whereby the stirring element is accepted by the opening of the bag.

2. The system of claim 1, wherein the ultrasonic transducers are configured around a perimeter of the lid, whereby the ultrasonic transducers encircle the mixer at a point where the mixer contacts the lid.

3. The system of claim 1, further comprising one or more revolving devices in the chamber configured to impart rotation to at least a portion of the source material in the chamber.

4. The system of claim 1, wherein the bag is meshed and comprises a pass-through plastic cover configured on the opening.

5. The system of claim 1, wherein the mixer further comprises:
- a motor configured to the shaft; and
- a rail system configured to selectively raise and lower the stirring element in the chamber.

6. The system of claim 1, further comprising a temperature control system configured to control a temperature of at least a portion of the contents of the chamber.

7. The system of claim 1, further comprising one or more filters configured to filter a solution obtained from the solvent and the source material.

8. The system of claim 1, wherein at least one of the substances is an organic compound.

9. The system of claim 8, wherein at least a portion of the source material is ground natural biomass.

10. The system of claim 8, wherein at least one of the substances is a metabolite.

11. The system of claim 10, wherein at least one of the substances is a primary metabolite.

12. The system of claim 10, wherein at least one of the substances is a secondary metabolite.

13. The system of claim 8, wherein the source material comprises plant matter.

14. The system of claim 8, wherein the source material comprises fungal matter.

15. The system of claim 8, wherein the source material comprises animal matter.

* * * * *